US011819718B2

(12) United States Patent
Menon

(10) Patent No.: US 11,819,718 B2
(45) Date of Patent: Nov. 21, 2023

(54) SYSTEMS, METHODS, AND ASSEMBLIES FOR IMPROVEMENT OF EXPLOSION AND FIRE RESISTANT PROPERTIES IN FLUID CONTAINERS

(71) Applicant: ATOM ALLOYS, LTD, Port Louis (MU)

(72) Inventor: Vinod Menon, Mumbai (IN)

(73) Assignee: ATOM ALLOYS, LTD, Port Louis (MU)

(*) Notice: Subject to any disclaimer, the term of this patent is extended or adjusted under 35 U.S.C. 154(b) by 0 days.

(21) Appl. No.: 17/021,668

(22) Filed: Sep. 15, 2020

(65) Prior Publication Data

US 2021/0060367 A1 Mar. 4, 2021

Related U.S. Application Data

(63) Continuation of application No. 16/444,635, filed on Jun. 18, 2019, now Pat. No. 10,773,111, which is a
(Continued)

(51) Int. Cl.
*A62C 3/06* (2006.01)
*B65D 90/40* (2006.01)
(Continued)

(52) U.S. Cl.
CPC ............ *A62C 3/065* (2013.01); *B21C 47/02* (2013.01); *B23P 17/00* (2013.01); *B65D 25/385* (2013.01);
(Continued)

(58) Field of Classification Search
CPC .......... A62C 3/065; B60K 2015/03381; B21C 47/02; B65D 25/385; B65D 90/22; B65D 90/40; B65D 90/52
See application file for complete search history.

(56) References Cited

U.S. PATENT DOCUMENTS

| 958,944 A | 5/1910 | Steward |
| 2,331,743 A | 10/1943 | Sullivan |
(Continued)

FOREIGN PATENT DOCUMENTS

| EP | 0256239 | 2/1988 |
| EP | 2256067 | 1/2010 |
(Continued)

OTHER PUBLICATIONS ofrmetals.com, ofrmetals.com, Aluminum Alloys 3003 and 5052: What's the Difference?, pp. 1-4 (O'Neal Flat Rolled Metals Website), Jun. 1, 2017.

*Primary Examiner* — Stephen J Castellano
(74) *Attorney, Agent, or Firm* — MALLOY & MALLOY, P.L.; William John Eagan; Peter A. Matos

(57) ABSTRACT

The present invention includes systems, assemblies, and methodologies for inhibiting combustion within fluid containers, enhancing the safety of such containers. One aspect includes a novel base module from which assemblies of varying shape and size, suitable for disposing within a variety of different fluid containers, are created. In one embodiment, the base module is made from an expanded mesh which is rolled in a novel cylindrical configuration according to a novel methodology. In another embodiment, the base module may be combined with other base modules to form an assembly. The present invention is also directed to an apparatus and method for creating base modules which allows for varying density of the base modules and therefore varying flexural strength and rigidity of the assemblies. As such, the packing density of assemblies within containers may be optimized to produce the desired effect of inhibiting combustion within the container.

12 Claims, 18 Drawing Sheets

Related U.S. Application Data continuation of application No. 15/975,518, filed on May 9, 2018, now Pat. No. 10,322,308.

(60) Provisional application No. 62/635,177, filed on Feb. 26, 2018.

(51) Int. Cl.
*B65D 25/38* (2006.01)
*B21C 47/02* (2006.01)
*B23P 17/00* (2006.01)
*B65D 90/52* (2006.01)
*B65D 90/22* (2006.01)

(52) U.S. Cl.
CPC ............ *B65D 90/22* (2013.01); *B65D 90/40* (2013.01); *B65D 90/52* (2013.01); *Y10T 29/30* (2015.01); *Y10T 29/5142* (2015.01); *Y10T 29/5198* (2015.01)

(56) References Cited

U.S. PATENT DOCUMENTS

| | | | |
|---|---|---|---|
| 2,829,733 A | 4/1958 | Bartels et al. |
| 3,018,019 A | 1/1962 | Gibbs, Jr. |
| 3,112,043 A | 11/1963 | Tucker |
| 3,356,256 A | 12/1967 | Szego |
| 3,495,506 A | 2/1970 | Plymale |
| 4,149,649 A | 4/1979 | Szego |
| 4,187,092 A | 2/1980 | Woolley |
| 4,566,589 A | 6/1986 | Poschinger |
| 4,613,054 A | 9/1986 | Schrenk |
| 4,621,397 A | 11/1986 | Schrenk |
| 4,925,053 A | 5/1990 | Fenton et al. |
| 4,988,011 A | 1/1991 | Fenton et al. |
| 4,988,020 A | 1/1991 | Webb |
| 5,000,336 A | 3/1991 | Gass |
| 5,001,017 A | 3/1991 | Alhamad et al. |
| 5,020,566 A | 6/1991 | Shoop |
| 5,172,444 A | 12/1992 | Penet |
| 5,246,130 A | 9/1993 | Mondt et al. |
| 5,460,672 A | 10/1995 | Mallonee |
| 5,500,037 A | 3/1996 | Alahamad |
| 5,575,339 A | 11/1996 | Alhamad |
| 5,781,976 A | 6/1998 | Stuhlbacher et al. |
| 5,782,735 A | 7/1998 | Goodrich et al. |
| 6,062,316 A | 5/2000 | Alhamad |
| 6,425,547 B1 | 7/2002 | Singh |
| 6,604,644 B1 | 8/2003 | Fenton |
| 6,609,279 B2 | 8/2003 | Kogler |
| 6,699,563 B1 | 3/2004 | Alhamad |
| 6,751,835 B2 | 6/2004 | Fenton |
| 7,178,565 B2 | 2/2007 | Eichelberger et al. |
| 8,176,931 B1 | 5/2012 | Cajiga et al. |
| 8,528,766 B2 | 9/2013 | Huang |
| 8,573,242 B2 | 11/2013 | Cajiga et al. |
| 9,181,078 B2 | 11/2015 | Cajiga et al. |
| 9,815,683 B1 | 11/2017 | Kalala et al. |
| 9,856,821 B1 | 1/2018 | Svrcek |
| 10,322,308 B1 | 6/2019 | Menon |
| 10,322,924 B2 | 6/2019 | Frizzie |
| 10,525,293 B2 | 1/2020 | Menon |
| 10,773,111 B2 | 9/2020 | Menon |
| 10,926,116 B2 | 2/2021 | Menon |
| 2004/0188435 A1 | 9/2004 | Fenton |
| 2006/0169823 A1 | 8/2006 | Jelinek et al. |
| 2008/0305299 A1 | 12/2008 | Diaz Del Rio Perez |
| 2010/0233502 A1* | 9/2010 | Huang |
| 2011/0177371 A1* | 7/2011 | Belton |
| 2018/0318908 A1* | 11/2018 | Stergioulas |
| 2019/0262639 A1 | 8/2019 | Menon |
| 2019/0262640 A1 | 8/2019 | Menon |
| 2019/0344106 A1 | 11/2019 | Menon |

FOREIGN PATENT DOCUMENTS

| | | |
|---|---|---|
| EP | 2241485 | 10/2010 |
| ES | 2241485 | 10/2005 |
| JP | 2009539712 | 11/2009 |
| JP | 2010535134 | 11/2010 |
| JP | 2017052651 | 3/2017 |
| JP | 2020514191 | 5/2020 |
| KR | 101216700 | 12/2012 |
| WO | WO0071798 | 11/2000 |
| WO | WO2000071798 | 11/2000 |
| WO | WO08122826 | 10/2008 |
| WO | WO2014115357 | 7/2014 |

* cited by examiner

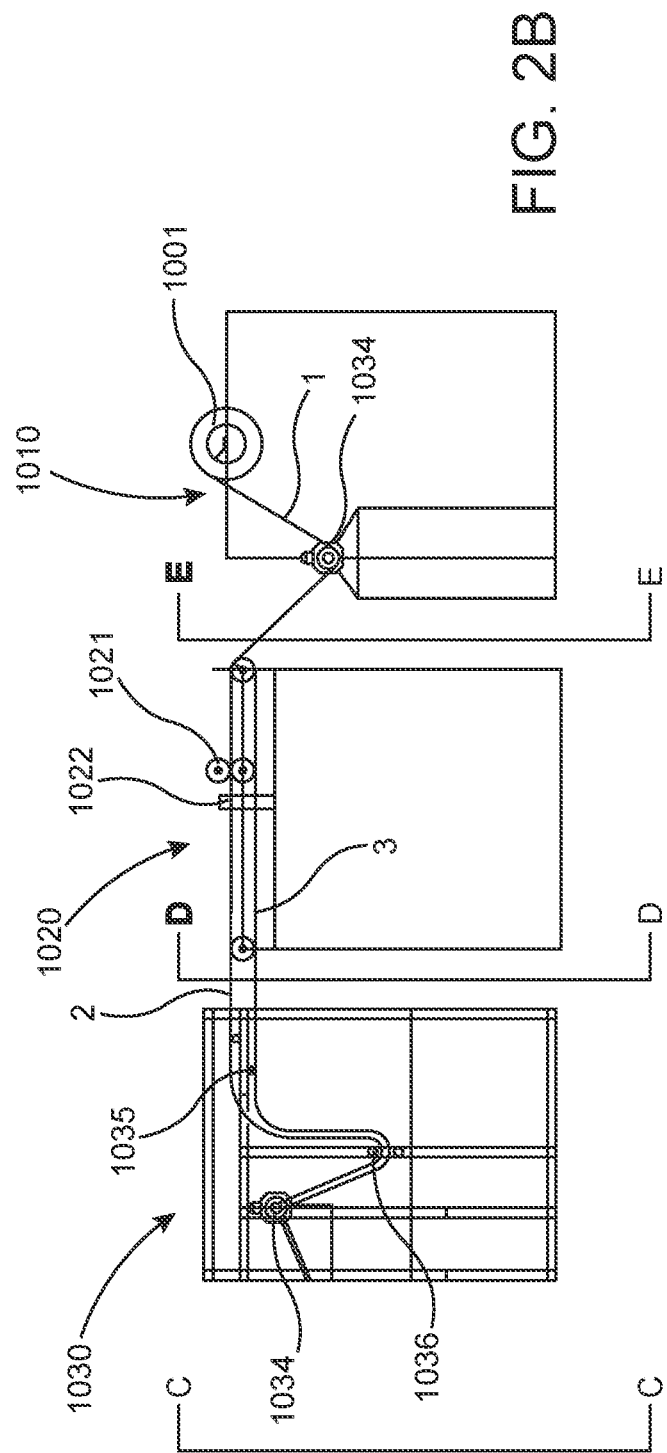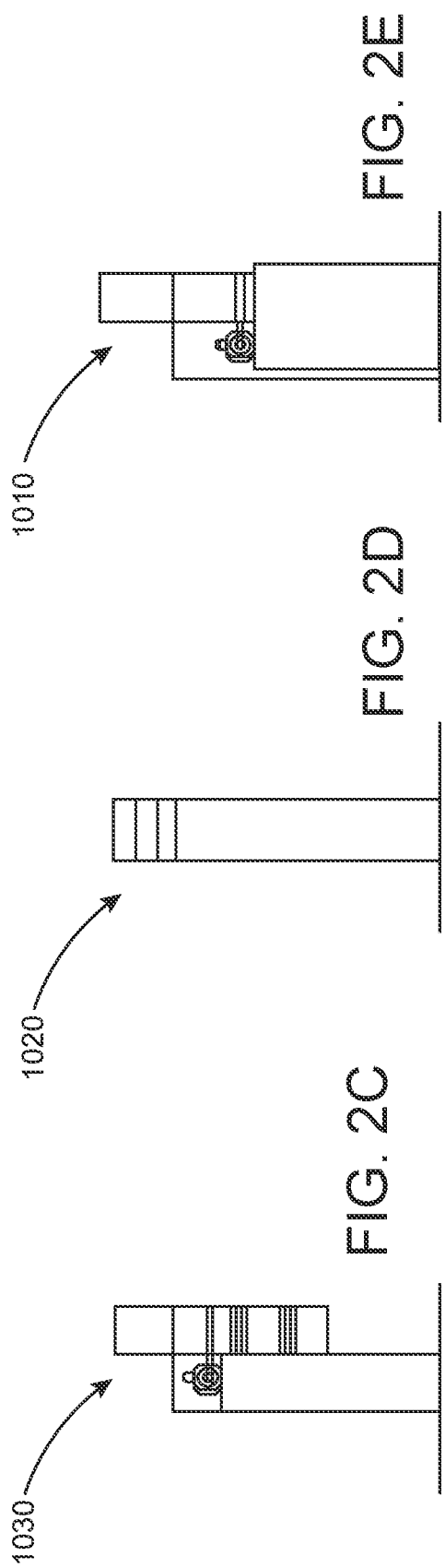

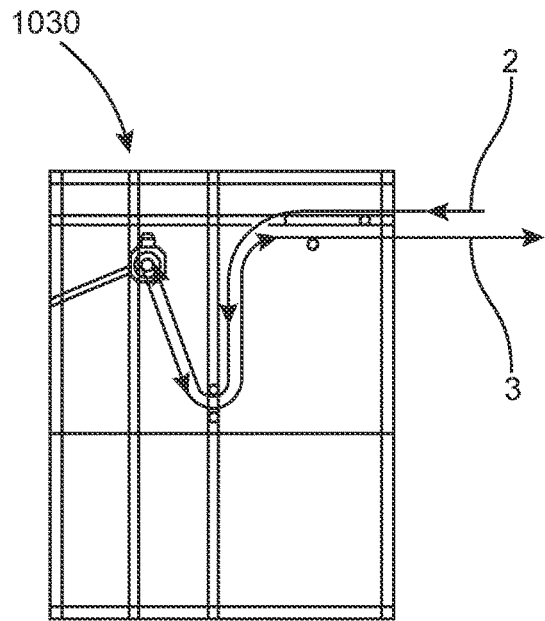 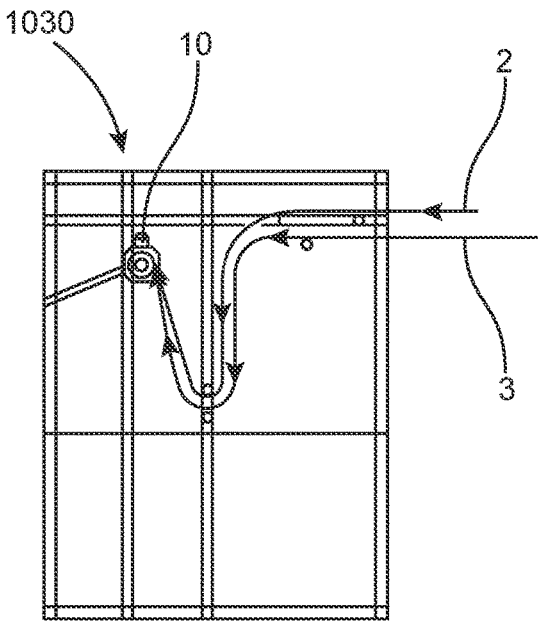
FIG. 2F    FIG. 2G
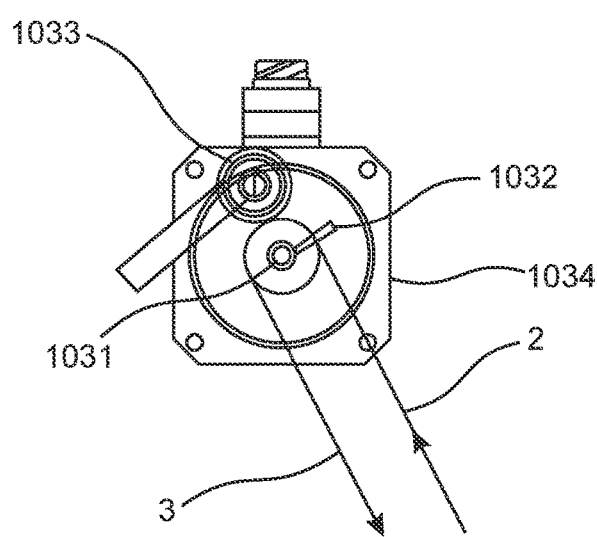 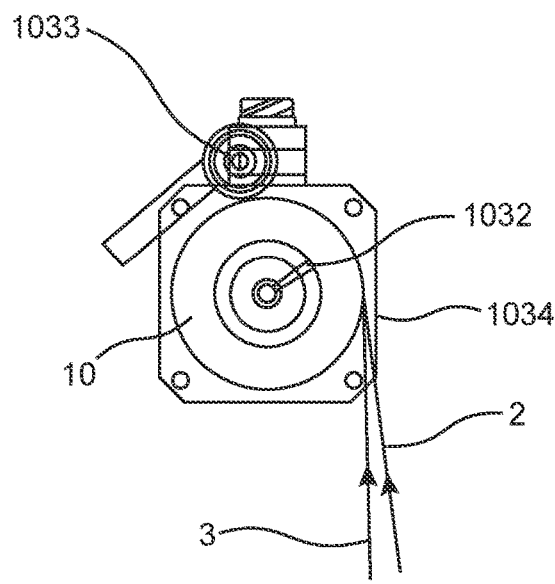
FIG. 2H    FIG. 2I

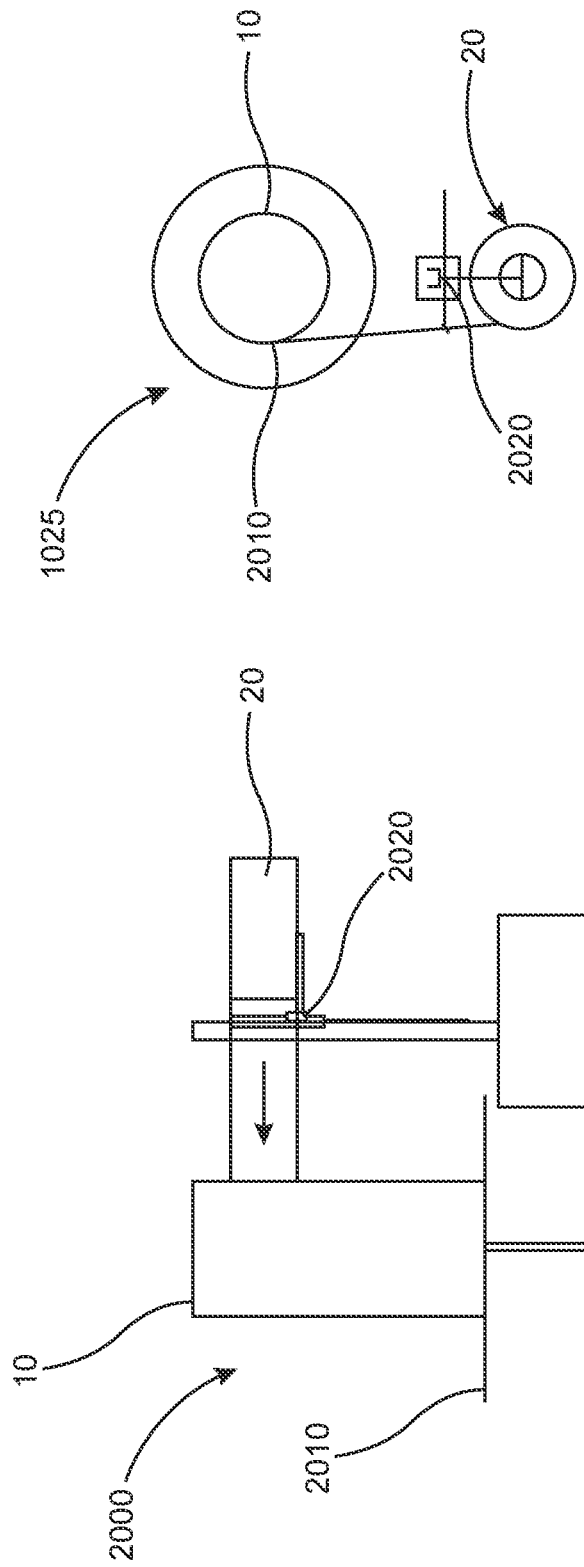

SYSTEMS, METHODS, AND ASSEMBLIES FOR IMPROVEMENT OF EXPLOSION AND FIRE RESISTANT PROPERTIES IN FLUID CONTAINERS

CLAIM OF PRIORITY

This present application is a continuation of U.S. patent application Ser. No. 16/444,635, filed on Jun. 18, 2019, now U.S. Pat. No. 10,773,111, which is a continuation of U.S. patent application Ser. No. 15/975,518, filed on May 9, 2018, now U.S. Pat. No. 10,322,308, and which claims the benefit pursuant to 35 U.S.C. § 119(e) to U.S. Provisional Patent Application Ser. No. 62/635,177 filed on Feb. 26, 2018, the contents of each of which are explicitly incorporated herein, by reference, in their entireties.

BACKGROUND OF THE INVENTION

Field of the Invention

The present invention is directed to systems, assembles, apparatus, and associated methodologies for improving fire and explosion resistance in fluid containers, such as liquid and gaseous fuel tanks.

Description of the Related Art

In one embodiment, the present invention suppresses the combustion, or tendency to combust, of the fuels and gasses stored within the inventive containers described herein. In one aspect, the inventive apparatus of the present invention reduces the ignitability of a system by increasing the heat loss characteristics via large and efficient heat conduction pathways, such as by disposing base modules made of expanded metal mesh inside of the containers. However, developing containers for transportation and storage of fuel and gas, which are not only effective at suppressing combustion, but also do not sacrifice other beneficial characteristics, calls for additional considerations beyond the mere conduction of heat away from the fuel or gas.

In certain embodiments, the size and volume of any solution disposed within the container should be minimal, so as to maximise the amount of fluid that may be disposed within the container. Additionally, the system should provide sufficient thermal conduction to maintain the fluid below its ignition temperature. The system should also provide, on average, fluid cavities that are not larger than the quench distance of the fluid therein. These factors are compounded by the necessity of mechanical integrity for an optimal system due to cyclical stresses that may be experienced as well as the potential for corrosion due to the fluid itself.

SUMMARY OF THE INVENTION

The present invention is directed to systems, assembles, apparatus, and associated methodologies for improving fire and explosion resistance in fluid containers, such as fuel and gas tanks. In basic principle, one embodiment of the present invention provides an inventive and efficient way to prepare expanded metallic mesh for suitable use as a heat conductor and flame quencher within a fluid container. The present invention makes use of such mesh in base modules, which in preferred embodiments are cylindrical in construction, and of varying diameter, as may be desired for a particular application. The base modules may be combined into assemblies to facilitate the packing of various types of containers.

In another embodiment, the present invention is directed to inventive fluid tanks, particularly for fuel, gas, or other combustible fluids, with unique systems and structures that inhibit combustion, and therefore fires and explosions.

The present invention is also directed to various methods and apparatus enabling fabrication of the base modules to be inserted within containers of various shapes and capacity and the associated method of fabrication, assembly, and packaging. The invention also includes methods of assembly and retrofitting of existing fuel tanks. In a further embodiment of the invention, it provides safe transportation of fuels as well as safe and rapid installation and dispensation of fuels on variety of surfaces and terrains in a stand-alone manner. In at least one preferred embodiment, the present invention utilizes low density perforated sheets or webs of metallic materials such as those disclosed by U.S. Pat. No. 6,609,279 to Kogler.

As described above, the basic module of the present invention may include one or more layers of mesh rolled into a cylindrical configuration. Two or more basic modules may be combined along a cylindrical axis to form an assembly of the present invention. Assemblies, and in certain embodiments, the base modules themselves, may be disposed within containers, which not only control combustion, but also provides strength and reduces "sloshing" of liquids that may be generated during transportation and other application-induced vibration, thereby removing the need for baffles in fuel tanks. Further, the basic module reduces evaporation loss due to heat transferred from vaporous regions of a container to liquid regions.

In a preferred embodiment, the basic module is constructed of two counter layers of metallic mesh which exhibits good conductivity, corrosion resistance, and strength. Although any materials which satisfy above requirements can be used, extensive research and testing has led to the conclusion that certain alloys may be employed in specific use cases. The materials should be compatible with various liquid fuels and should have good mechanical strength. Alternatively, for high strength requirements, a mesh of special steels, in particular stainless steel, can be used. As steel has relatively low thermal conductivity, when compared to other alloys, a composite mesh of steel and copper and/or copper alloys, or composite of steel and aluminium mesh rolled into a cylindrical configuration may be utilized in order to increase the thermal conductivity of the overall assembly.

The invention is also directed to the design and methods of manufacturing of a generally cylindrical shape of compact semi-porous unit developed from two dimensional mesh or web of predetermined density, which in certain embodiments may be constrained by a metallic net or perforated wrapper, the entire assembly comprised of base modules for filling the spaces within fuel containers.

The present invention is also directed to apparatus and associated methods to produce this base module without damage to the mesh or web that it is constructed from, and with a given density and form. In a further embodiment, the present invention is also directed to methods of packing the cylindrical units to containers of different shapes and dimensions in order to maximise the dispersion of the base modules within the volume of the container. For large containers, the space may be partitioned into different compartments that can be packed with the base module or assemblies thereof. The design of the base module also addresses mechanical integrity of the rolled, perforated, stretched sheets against impact loading, both at low and high strain rates, and importantly, preventing the formation of metallic particles that can contaminate the fuels, without resort to overly complex configurations of the base modules themselves.

In a preferred embodiment, the apparatus for forming the base module is capable of modulating the tension in the mesh during rolling of the basic module via tensioners, pre-tensioners, and weighted rollers. As such, the rigidity and flexural strength of the base modules may be adjusted for a given use case of the base module being formed, with tighter rolling of the base module leading to enhanced rigidity and flexural strength. Additionally, the diameter to height ratio of a base module may be adjusted according to these parameters.

Yet another feature of the present invention is the optimization of packing schemes for given container shapes and sizes. Particularly, the present invention takes advantage of the adjustable rigidity and flexural strength of the base modules to create base modules which are suitable for particular packing schemes. In a preferred embodiment, the packing of fuel drums in the 55 gallon class includes basic modules or assemblies having a diameter of approximately 20% of the drum diameter. Depending upon the particular parameters set by the base module production apparatus (tension, weight, etc.), approximately between 19 and 24 assemblies may be used to fill the drum. In yet another preferred embodiment, the packing of cuboid containers employs the use of two different diameters of base modules, the smaller diameter being approximately 40% of the diameter of the larger base module. As will then be appreciated, the packing scheme of the present invention is optimized for the use of semi-rigid base modules, which in a preferred embodiment are cylindrical in form.

Additionally, the base module is resistant to mechanical forces experienced during transportation or during exposure to impact, including penetration of projectiles. In a preferred embodiment, base modules of cylindrical configuration may be aligned along the expected gravitational vector during use and/or transportation of a container. Tests conducted using a tilt table evidence that the integrity of the mesh comprising the basic module is maintained when the longitudinal axis of the base module is substantially parallel to the gravitational axis. Extensive testing conducted with the longitudinal axis of the basic module at a substantial angle to the gravitational axis indicated enhanced and/or accelerated degradation of the mesh and generation of metal particles. Both of these conditions lead to decreased combustion resistance and contamination of the fluids stored within the container.

Yet another advantage of the present invention is the reduction of "sloshing" of fluid within the containers without the need to introduce purpose-built baffles. When the packing scheme of the present invention is utilized, an optimum and maximized packing capacity is achieved. Accordingly, slosh-induced impact of the base modules and tank during movement of the container is reduced, thereby enhancing the life span of the base module. The benefits of this aspect of the present invention can be realized across a variety of containers, from large tanks on ships to smaller containers for road transportation.

In yet another embodiment, the mesh may comprise high strength aluminium alloys that are corrosion resistant (by way of non-limiting example, 5052 aluminium alloy) and/or a mechanical composite of two or more meshes of dissimilar metals and alloys such as, but not limited to, stainless steel, high strength steel, high strength aluminium alloys, and copper alloys including pure copper, copper-bronze and other high-strength copper alloys such as, but not limited to, copper-titanium alloys. In essence, the composition of metals comprising the mesh, or composite mesh, may be selected, blended, and/or combined for a plurality of criteria, such as strength, rigidity, durability, corrosion resistance, heat absorption, and heat dissipation.

The inventive apparatus for forming the basic module according to at least two embodiments of the present invention are also disclosed herein. In a preferred embodiment, a feed stock of mesh is used to create base modules wherein the length of the base modules is dictated by the width of the feedstock. By way of non-limiting example, the width of the feed stock may be on the order of approximately 240-250 mm. Although, smaller base modules may be created by folding the feed stock according to inventive methodologies disclosed herein.

In one preferred embodiment, the mesh used for production of the base module is a two dimensional honeycomb web made of approximately 45 micron thick proprietary metal foil. Due to its architecture, the sheet of this class of materials tends to be prone to wrinkling and tear. These sheets are rolled into cylinders with varying density resulting in cylinders of varying flexibility and rigidity that also resist damage or fragmentation due to external stresses both under ambient and liquid fuel environment. Hence, some of the design considerations for the apparatus to construct these cylinders are the choice and application of rollers, as well as the creation of tension and varying speed for making different types of rolls.

The manufacturing of a cylindrical mesh roll is carried out by rolling counter layers of expanded mesh on a rolling spindle. The tensions in the counter layers can be adjusted to obtain variable rigidity and deformability of the base modules. The specification of the base module will vary for different applications. By way of non-limiting example, for certain applications the base module may require the additional capability of removing/absorbing the kinetic energy of a projectile, so that the projectile is trapped inside the mesh. Besides the use of high strength materials for the manufacture of the mesh, this can be achieved by making cylindrical mesh rolls of predetermined density. A denser roll can be achieved by varying at least two parameters, namely, the introduction of tension/strain on free rolling counter layers of expanded mesh via a tensioning spindle; and varying the speed (RPM) of the main roller/shaft. Thus, in a preferred embodiment, such an apparatus for the production of the cylindrical roll can vary at least these two parameters in order to achieve varying degrees of density in the rolls of cylindrical mesh as required for different applications.

A step by step description of the manufacturing process and associated description including the role of the different components of the apparatus, according to one embodiment of the present invention, is as follows. The initial feedstock for making a cylindrical basic module is a sheet of webbed mesh, which as discussed may comprise the mesh as disclosed in U.S. Pat. No. 6,609,279 to Kogler. A "large" roll of such sheets may include dimensions on the order of 900 mm in diameter and a width of 240-250 mm. An initial step may comprise the unwinding of the mesh from the roll and is carried out utilizing a guiding system with a sensor to a reverse crown spreader, preventing wrinkles and separating the webs. The roll in the reverse crown spreader has a variable diameter with the ends slightly larger than the center. The difference in surface speed due to this difference causes mesh tension distribution that can be shaped and controlled through the variable speed profile. This is most effective for an extensible material such as the expanded mesh utilized in the present invention.

The web is then passed over another roller, which in a preferred embodiment is made of polyurethane foam or similar materials, with a rough roll surface that allows passing of vent air from roll surface and prevents tracking, scratching, compressing and elongation of the mesh. This step is referred to as "air greasing."

Subsequently, the web is passed through a pair of idler foam rollers to flatten any lateral deformations in the web, which may also be used to at least partially control the speed and tension of the web. The principle of speed control of the web is as follows.

$$T_2 = T_1\left(\frac{V_2}{V_1}\right) + \frac{EA(V_2 - V_1)}{V_1}$$

Wherein, $T_2$ is the tension in a given region between two rollers, $T_1$ is the tension in the previous tension zone, $V_1$ is the velocity of one roller, and $V_2$ is the velocity of the second roller, E is the elasticity of the material, and A is the cross-sectional area of the material. It is noted that the larger the value of E, the more likely the material is to stretch. For most values of EA, the inventor has noted that varying the torque applied to a roller provides superior control of the material. However, for very "stretchy" material (very low values of EA) speed control may be an acceptable substitute if torque control is not feasible.

With this principle in mind, the web is passed through an idler roller before it is fed into the rolling section. It includes a pair of pre-tensioners and tensioners, as well as a weighted roller applied to the main spindle. The pre-tensioner guides the web to the main tensioner. The tension in the web can be adjusted through the positioning of the tensioner, the pressure applied by a weighted roller applied to the main spindle applying uniform lateral pressure across the mesh as it is rolled on the main spindle, as well as the torque/speed of the main spindle.

More specifically, after the web passes through the first pre-tensioner, it enters the main tensioner from which it is guided to the main roller. The web travels around the main roller to reenter the main tensioner at a different level and move to the second pre-tensioner. From this, the web is extruded (pushed) to a predetermined point in the conveyor belt. At this point a cutter is used to cut the web on the primary conveyor, severing it from the mesh spool. This produces one sheet of mesh disposed in two counter layers on the conveyor belt for making a cylindrical basic module. The total length of the mesh dictates the diameter of the base module.

The web, which is now disposed across counter layers, is rolled from approximately the mid-point thereof. The web is held captive against the main spindle using a spindle lock. The weighted roller is placed against the web on the main spindle to provide uniform lateral pressure on the rolling web. Following this, the motor is triggered and the mesh is rolled onto the main spindle to produce the base module that can be stacked for producing an assembly of desired height. Once the rolling is complete the weighted roller is removed and the spindle lock is released to remove the base module. By controlling the pressure of the—weighted roller, the tension applied by the tensioner, and the speed/torque of the main spindle, the density of the tower cylinder can be controlled.

A net may be applied to the exterior of the base module. The choice of the material for the net varies according to application. For critical or strategic applications, metal wire of higher tensile strength (such as the class of stainless steels referred to as "super") is used; this helps in stopping or absorbing the kinetic energy of impacts and/or projectiles. The net also prevents the fragmentation of the mesh rolls during movement/transport. The presence of the net additionally reduces the abrasive effect that expanded mesh rolls could have on plastic tanks and rubber seals inside metal tanks. An alternative to the steel jacket for other applications may be to wrap the cylinder with the similar mesh of other materials.

The present invention is also directed to systems and methods for packing various containers of various sizes with the aforementioned structures. The geometry of the stacking is determined by the shape of the final tank and requirement of dense packing in three dimensions to effect heat dissipation for preventing the uncontrolled growth of a combustion front and hence, varies for different shapes. The filling process in actual tanks is versatile; the installation process is capable of retrofitting any existing tank; and the process is environmentally friendly.

One objective of the inventive method is to provide a uniform conducting path for thermal dissipation within the container. Thus the density of the packing and the method of achieving it is significant to the optimal function of the present invention.

The base modules may be stacked along a cylindrical axis to create an assembly with a given shape and density as well as to contain a mechanism for filling and withdrawing liquids at a reasonable rate. The latter is achieved by introducing a perforated fluid transport channel designed to take into account volumetric flow of the fluid as well as the geometry of the tank. In a preferred embodiment, the entire assembly is shaped by wrapping it with nets in such a way that it can be introduced into the empty tank.

In order to wrap the assembly in a net, the assemblies of base modules, together with any mechanism of liquid transfer as well as any required sensors are mounted on a wrapping machine. The net (preferably, but not necessarily, stainless steel mesh) is wrapped over the base module to provide shape and stability to the entire cluster of assemblies.

In this regard, yet another aspect of the present invention is an inventive wrapping machine that is capable of motion in both X and Y axes with similar speeds to provide uniform wrapping. The wrapping material (which in certain embodiments may comprise the same mesh as the base modules) is mounted on the X axis on a cantilevered arm of the wrapping machine. In a preferred embodiment, the wrapping operations are carried out to provide four counter layers in a horizontal orientation, and two counter layers in a vertical orientation.

In yet another embodiment, the present invention is deployed in conjunction with a fuel drum, typically of the 55 gallon class, but the principles of the present invention can be deployed in a variety of cylindrical containers, such as propane tanks. To achieve a light weight, fire retardant assembly for use during transport, use, filling, and dispensation of fluids. One preferred embodiment encompasses a filler or base module for explosion retarding materials that enable manufacturing of a light-weight, explosion-retardant, polymer drum (e.g., high density polyethylene) which is packed with a plurality of assemblies and a perforated fluid transport channel.

In yet another embodiment, the present invention may be deployed in conjunction with military, police, or other fuel containers which are likely to be exposed to penetration via projectiles, such as bullets or shrapnel. In such an embodiment, the mesh forming the basic modules may be made from high strength alloys, such as steel, and incorporated alongside other meshes, such as copper or aluminium, that have good heat transfer characteristics. In one preferred embodiment, the present invention may utilize a mechanical composite of stainless steel and copper or aluminium in a single mesh. The high strength materials impart additional resistance to projectiles. In yet another embodiment, the high strength mesh materials may be disposed along an outer periphery of the interior of the tank, while the heat conducting mesh materials are disposed within an interior portion. In yet further embodiments, the two portions may be partitioned such that, in the event of a puncture, the inner, heat conducting mesh portion, may still retain fuel.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2B is an elevation view of a portion of the apparatus disclosed in FIG. 3A.

FIG. 2C is a detail view taken along line C-C of FIG. 2B.
FIG. 2D is a detail view taken along line D-D of FIG. 2B
FIG. 2E is a detail view taken along line E-E of FIG. 2B.
FIG. 2F is a detail view of a portion of the apparatus disclosed in FIG. 2B disposed in an unspooling configuration.
FIG. 2G is a detail view of a portion of the apparatus disclosed in FIG. 2B disposed in a rolling configuration.
FIG. 2H is a detail view of FIG. 2F.
FIG. 2I is a detail view of FIG. 2G.
FIG. 4A is a side view schematic depiction of a wrapping assembly according to one embodiment of the present invention.
FIG. 4B is a top view schematic depiction of a wrapping assembly according to one embodiment of the present invention.

Like reference numerals refer to like parts throughout the several views of the drawings.

DETAILED DESCRIPTION OF THE PREFERRED EMBODIMENT

Figure 1A:
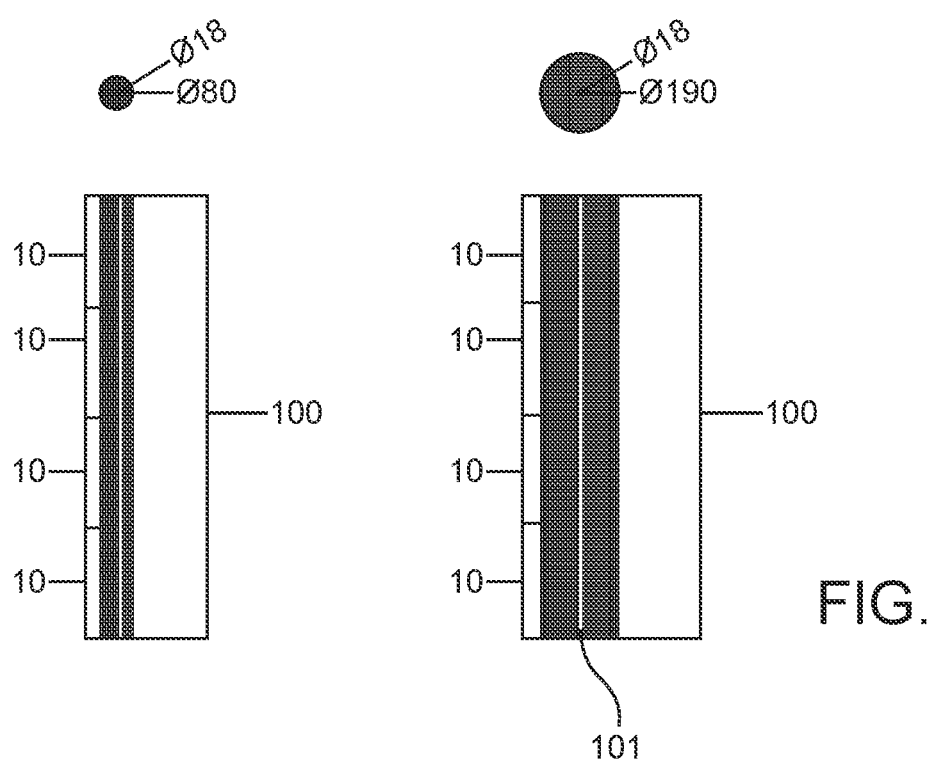
FIG. 1A is a schematic depiction of two assemblies of different aspect ratios according to one embodiment of the present invention.
Figure 1B:
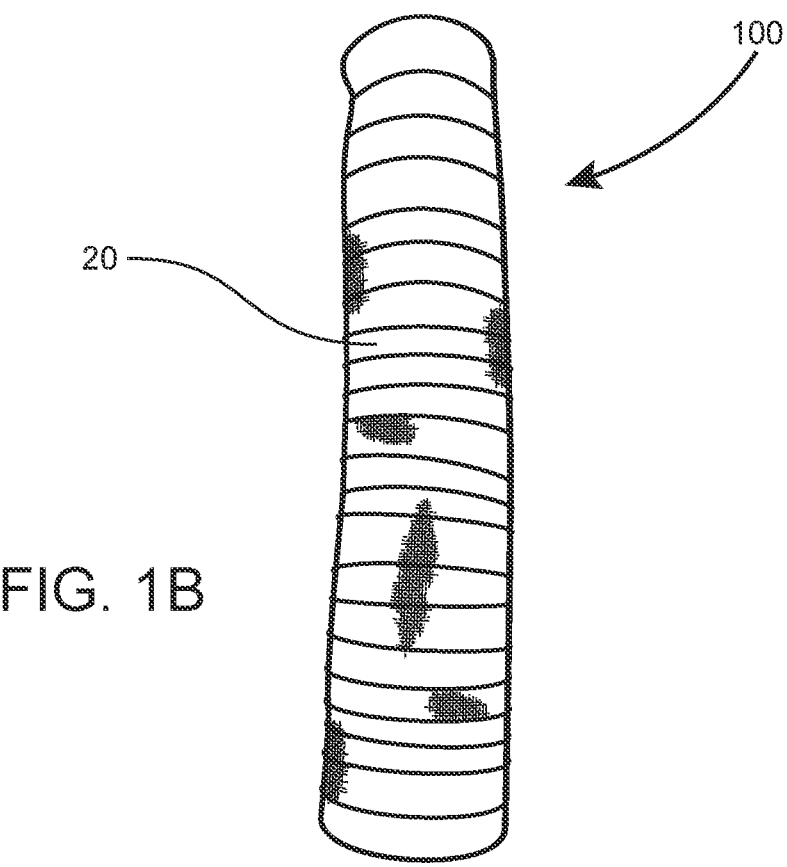
FIG. 1B is a depiction of an assembly wrapped in a net according to one embodiment of the present invention.
Figure 2A:
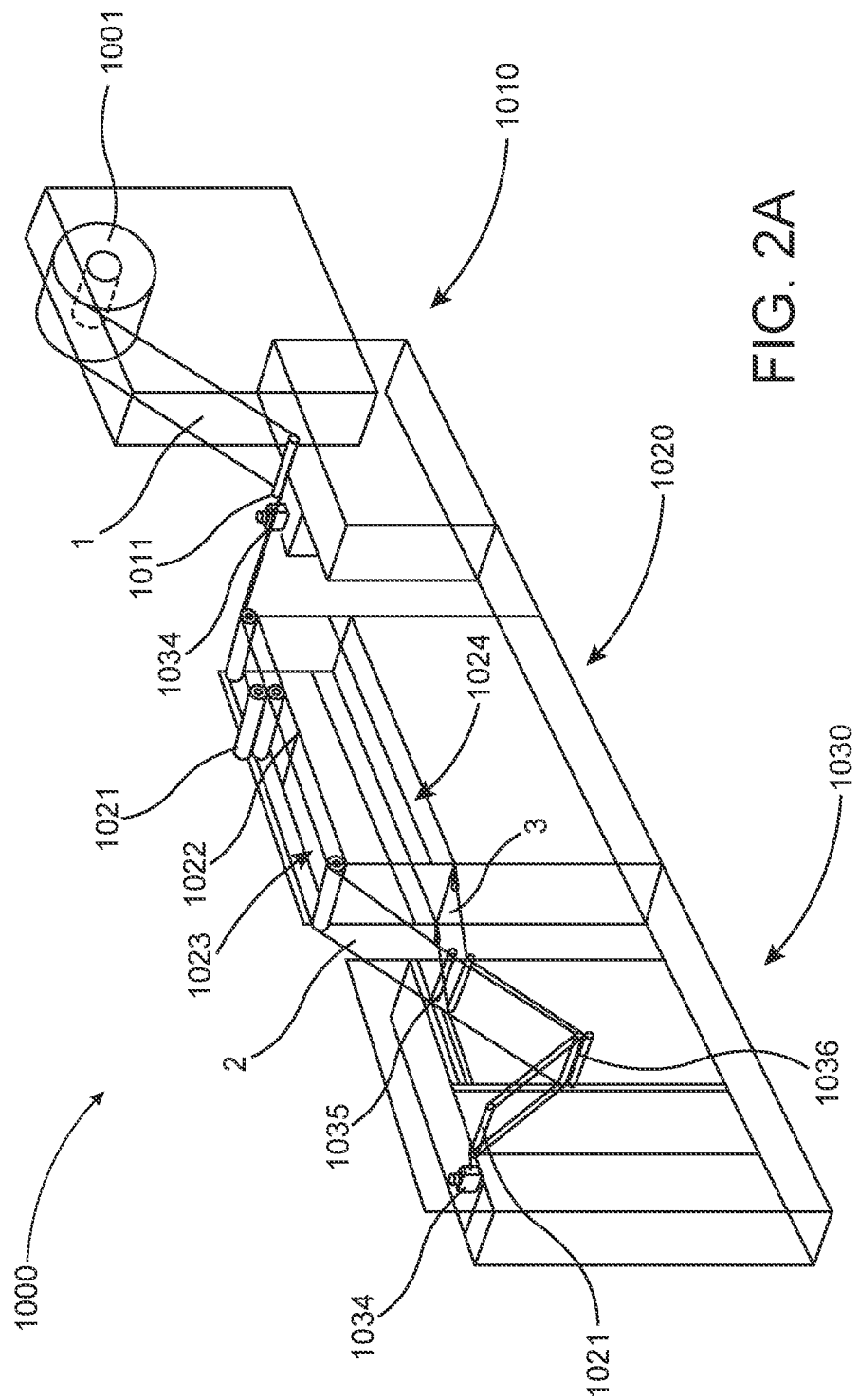
FIG. 2A is a schematic depiction of an apparatus for manufacturing of certain elements of the present invention.

An assembly 100 according to one embodiment of the present invention in depicted in FIGS. 1A and 1B. As can be seen, the assembly is constructed of a plurality of base modules 10 secured in a cylindrical configuration by a net 20. The base modules 10 are arranged along a cylindrical axis 101 to form an assembly 100.

In a preferred embodiment, the base modules 10 are constructed of at least two layers of mesh] 1 (but may include more or less layers) rolled into a cylindrical configuration until a desired diameter is reached. In a most preferred embodiment, a cylindrical base module 10 should have a diameter to height ratio typically (but not limited to) on the order of 0.19, i.e., diameter/height=0.19. However, this may vary as, e.g., smaller cylindrical basic modules may be utilized to increase the packing density of assemblies 100 within a container. To facilitate efficient manufacturing, the height of a basic module 10 may correspond to the width of the feed stock of mesh (as discussed below), but other manufacturing methods are envisioned (as also discussed below).

With specific reference to FIG. 1B, a plurality of basic modules 10 have been arranged along a cylindrical axis 101 to form an assembly 100. Furthermore, the assembly 100 is secured with a net 20, which in the depicted embodiment is a single layer of mesh 1, which has been wrapped about the assembly 100 in overlapping fashion until all basic modules 10 within the assembly 100 are secured together. In yet further embodiments, the net 20 may be comprised of different material than the mesh 1, as long as it is suitably porous to allow fluid to flow there through. The depicted embodiment discloses a net 20 comprised of the same feed stock of mesh 1 as the basic module 10, which provides efficiencies in supply procurement and manufacturing. However, with such a net 20 material, it is necessary to overlap successive wraps of the net 20 along the length of the cylindrical axis 101 in order to sufficiently secure each basic module 10 together. If a net 20 of different material and/or dimension is utilized, it may not be necessary to provide such an overlapping configuration. By way of non-limiting example, feed stock for the net 20 material may be selected such that the width of the feed stock is approximately equal to the length of the cylindrical axis 101 of the assembly 100 and, as such, no overlapping configuration is required.

As also discussed, the net 20 may be comprised of virtually any sufficiently porous material to allow fluid to flow through, while also providing sufficient structural integrity to enclose and secure the plurality of basic modules 10 into an assembly 100.

As can be seen, the arrangement of basic modules 10 in a rolled, cylindrical configuration provides a certain amount of structural integrity, at least with respect to compression along the cylindrical axis 101 of each basic module and, when arranged into an assembly along such a cylindrical axis 101, the structural integrity of the assembly 100 along the cylindrical axis 101 is not compromised. Accordingly, as will be disclosed herein, when an assembly 100 is disposed within a container, a preferred embodiment of the invention calls for alignment of the cylindrical axis 101 with the normal anticipated gravitational vector of the container, i.e., the assembly 100 should be oriented substantially parallel to the direction of gravity during operation and/or storage of the container.

Now turning to FIGS. 2A-2F, depicted therein is an inventive apparatus 1000 for production of base modules 10 according to one embodiment of the present invention. The depicted embodiment includes at least an initial stage 1010, an intermediate stage 1020, and a rolling stage 1030. The initial stage 1010 includes operative structuring to receive a mesh spool 1001 of mesh 1 material, with a predetermined width. The initial stage 1010 may also include a spreader roller 1011 which may also be driven by a motor 1034. In a preferred embodiment the spreader roller 1011 is of the reverse crown type, which has a larger diameter at the ends of the roller than in the middle. This configuration is operative to create a larger surface speed at the ends of the roller, which in turn will distribute tension from the center of the mesh 1 toward the edge of the mesh 1 as it passes over the roller 1011, thereby removing irregularities, such as wrinkles, from the surfaces of the mesh 1. Additionally, in embodiments where the spreader roller 1011 is driven via a motor 10304, this spreader roller 1011 will be operative to conduct the mesh 1 away from the mesh spool 1001 and toward the remaining stages of the apparatus 1000.

The intermediate stage 1020 of the apparatus 1000 may include a plurality of rollers 1021, which may be configured in a "nip roller" configuration, and may also be comprised of a foam or other polymer material, which are operative to smooth any lateral deformations of the mesh 1. In certain embodiments, it may be desirable to employ air greasing in conjunction with any of the rollers described herein, in which air is directed between the mesh 1 and the roller to reduce the chance of slippage, deformation, and other undesirable effects. Additionally, the intermediate stage 1020 may include at least a primary carriage path 1023 and a secondary carriage path 1024. As can be seen, the mesh 1 is conducted along the primary carriage path 1023 along a region between the mesh spool 1001 and the rolling stage 1030, whereas the mesh 1 is conducted along the secondary carriage path 1024 after passing through the rolling stage 1030 and returning at least partially into the intermediate stage 1020.

The rolling stage 1030 may comprise a shaft 1031, about which the mesh 1 may travel, along with a suitable number of tensioners 1036 and pre-tensioners 1035. With respect to FIG. 2H, a detail view of the shaft 1031, drive motor 1034, and other operative components may be seen in greater detail. According to the depicted embodiment, the mesh 1 may be guided about the shaft 1031 and allowed to return toward the intermediate stage 1020. The shaft 1031 may be operatively coupled with a spindle lock 1032, which is operative between a locked and unlocked orientation. When the spindle lock 1032 is in an unlocked orientation, as depicted in FIG. 2H, the mesh 1 is allowed to pass around the shaft 1031, but when the spindle lock 1032 is in a locked orientation, as depicted in FIG. 2I, the mesh 1 is constrained to rotate with the shaft. As such, the apparatus 1000 is operative between an unspooling configuration, as depicted in FIG. 2H, and a rolling configuration, as depicted in FIG. 2I, associated with the locked and unlocked orientation of the spindle lock 1032.

More specifically, the mesh 1 of the mesh spool 1000 may be initially fed through the intermediate stage 1020, along the primary carriage path 1023 thereof, into the rolling stage 1030 and then back to the intermediate stage 1020 via the secondary carriage path 1024 until a desired length of mesh 1 is unspooled from the mesh spool 1001. This is accomplished with the spindle lock 1032 in an unlocked orientation and, accordingly, the apparatus 1000 is in an unspooling configuration. In this step, a first layer 2 and second layer 3 of mesh 1 is formed. The cutter 1022 may be used to sever the first layer 2 and second layer 3 from the mesh spool 1001. The unspooling configuration may utilize one or more motors and/or motorized shafts/rollers to conduct the mesh 1 out of the spool 1001.

Then, the apparatus 1000 is converted into a rolling configuration via conversion of the spindle lock 1032 into a locked configuration. As can be seen in detail in FIGS. 2G and 2I, the first layer 2 and second layer 3 are held captive against the shaft 1031 and are both constrained to rotate with the shaft 1031, instead of passing over the shaft. As such, the first layer 2 and second layer 3 are fed into the roll that forms the base module 10.

As may be seen throughout FIGS. 2H-2, a roller 1033, which may be weighted, is disposed to rest against the mesh 1 that passes over the shaft 1031, as well as during formation of the base module 10. The roller 1033 may be pivotable such that it may move as the base module 10 grows in diameter about the shaft 1031. The roller 1033 provides a uniform lateral distribution of pressure on the mesh 1.

The pre-tensioners 1035, tensioners 1036, roller 1033, and the motor 1034 driving the shaft 1031 may all include parameters that are adjustable to control the compactness of the base module 10 as it winds about the shaft 1031. As such, the roll density of the base module 10 may be affected via adjustment of such parameters. For a given compactness of the base module, i.e., how dense each layer of mesh 1 is rolled into the base module 10, the length of mesh 1 necessary to achieve a desired diameter may be determined and accordingly such length may be unspooled in the unspooling configuration of the apparatus 1000.

Figure 3A:
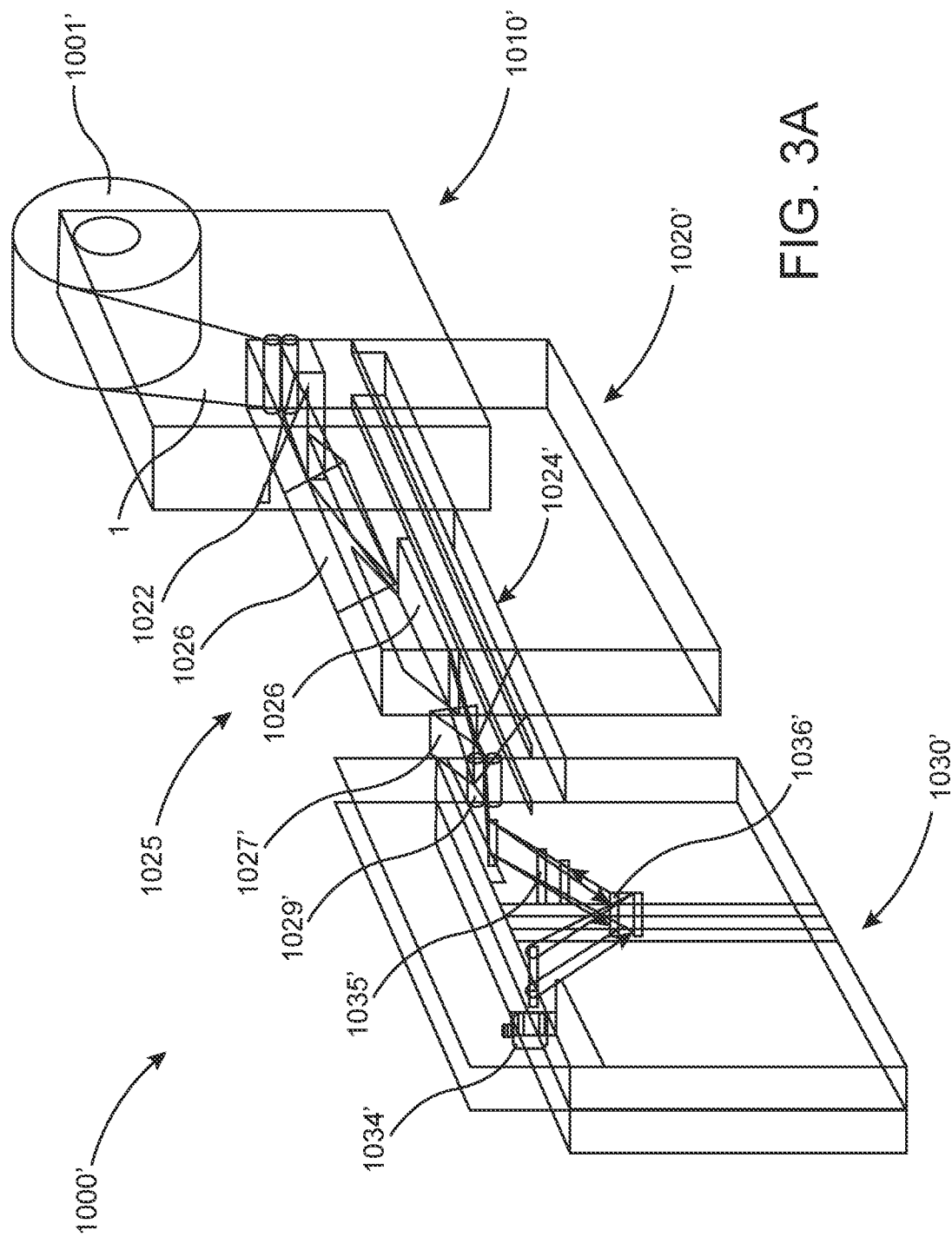
FIG. 3A is a schematic depiction of an apparatus for manufacturing certain elements of the present invention according to another embodiment of the present invention.
Figure 3B:
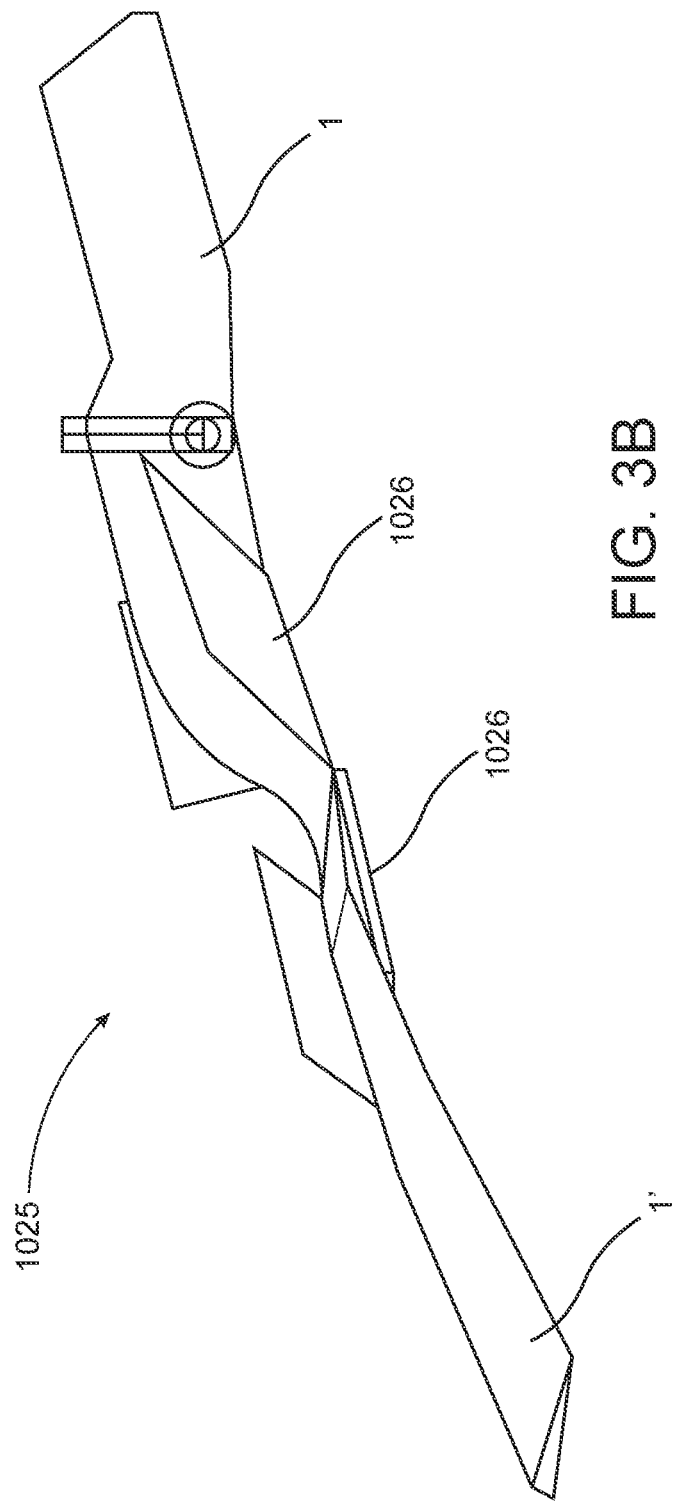
FIG. 3B is a detail view of a portion of the apparatus disclosed in FIG. 3A.

In certain embodiments, it may be desirable to form a cylindrical basic module 10 of longitudinal dimension which is less than the width of the feed stock. FIGS. 3A and 3B disclose an alternative embodiment of the apparatus 1000' for the production of such a basic module 10, according to one embodiment of the present invention. Such an apparatus 1000' is capable of folding the feed stock of mesh 1 along its length, without damaging the mesh 1. The apparatus 1000' includes a folding assembly 1025 which is operative to accomplish the fold in partial stages. As such, a plurality of partial fold assemblies 1025 may be provided. In the depicted embodiment, the partial fold assemblies comprise "V" shaped assemblies in horizontal and vertical orientations. When the mesh 1 passes through each successive partial fold assembly 1025, the mesh is successively and progressively folded at a predetermined point along its width. An inlet hopper 1027 may be provided to "gather" the loosely folded mesh 1 into a more compact orientation, and a pair of finish rollers 1029, such as nip rollers, flatten the two halves of the mesh 1 against one another. In other embodiments, the invention may be operative to fold the mesh 1 at two, three, or more points along its width with successive and progressive partial fold assemblies 1025.

As discussed, in a preferred embodiment, multiple base modules 10 may be combined into an assembly with a cylindrical form factor by encapsulating the base modules in a net 20, which may be comprised of mesh 1, or other suitable material such as stainless steel wire or other metal wires. An inventive wrapping assembly 2000, according to one embodiment of the present invention, is depicted in FIGS. 4A and 4B. Therein, a plurality of base modules 10 are disposed on a turn table 2010. A spool of net 20 material is disposed on a railing 2020 and is allowed to travel transversely along the length of the railing 2020. Accordingly, the net 20 material may be fed onto the base modules 10, and the turn table 2010 rotated as the net 20 material unspools and travels along the length of the railing 2020, thereby encapsulating the base modules 10 into an assembly 100. As will be disclosed further, multiple assemblies 1000 may be wrapped together to be disposed within certain types of containers to create clusters, such as drum clusters, can clusters, or cell clusters as will be disclosed herein. In a preferred embodiment, a wrapping procedure of the present invention will include at least 4 layers about the cylindrical axis of a cluster and at least 2 layers perpendicular to the cylindrical axis of the cluster. Additionally, the wrapping assembly 2000 may be manually operative or equipped with sufficient motorized transducers to allow automated wrapping.

FIGS. 5A-5D depict a plurality of assemblies 1000 disposed in various stages of a drum cluster 110 configuration, according to one embodiment of the present invention, which is suitable for packing a fuel drum-type fluid container, such as the standard 200 litre/55 gallon drums as are common in the industry. A plurality of assemblies 1000 are produced with a cylindrical axis 101 substantially equal to the height of the drum 4000 to be filled. The assemblies 1000 are compacted together in diameter approximately equal to that of the drum 4000 to be filled as well. The depicted embodiment, referred to as a drum cluster 110 may be wrapped, according to substantially the same methodology as previously disclosed, i.e., with a net 20 and placed within the drum 4000. As can be seen, a fluid transfer channel 3000 may be disposed within the drum cluster 110 and comprise a substantially hollow and porous configuration. This facilitates placement of pump lines, hoses, and other fluid conduits within the drum.

Optimizing the packing density of the assemblies 1000 in a cylindrical fuel tank presents a more difficult challenge than a rectangular geometry. In a preferred embodiment, between 19 and 24 assemblies 1000, along with a fluid transfer channel 3000, are disposed within the drum 4000. The diameter of the assembly 1000 required for packing depends on the diameter of the empty tank that needs to be filled. In a preferred embodiment, the diameter of the assembly 1000 may be on the order of 20% of the drum diameter, for example, within 1% deviation. Such an arrangement produces negligible cavities for combustion and hence provides effective fire and explosion resistance.

Figure 5A:
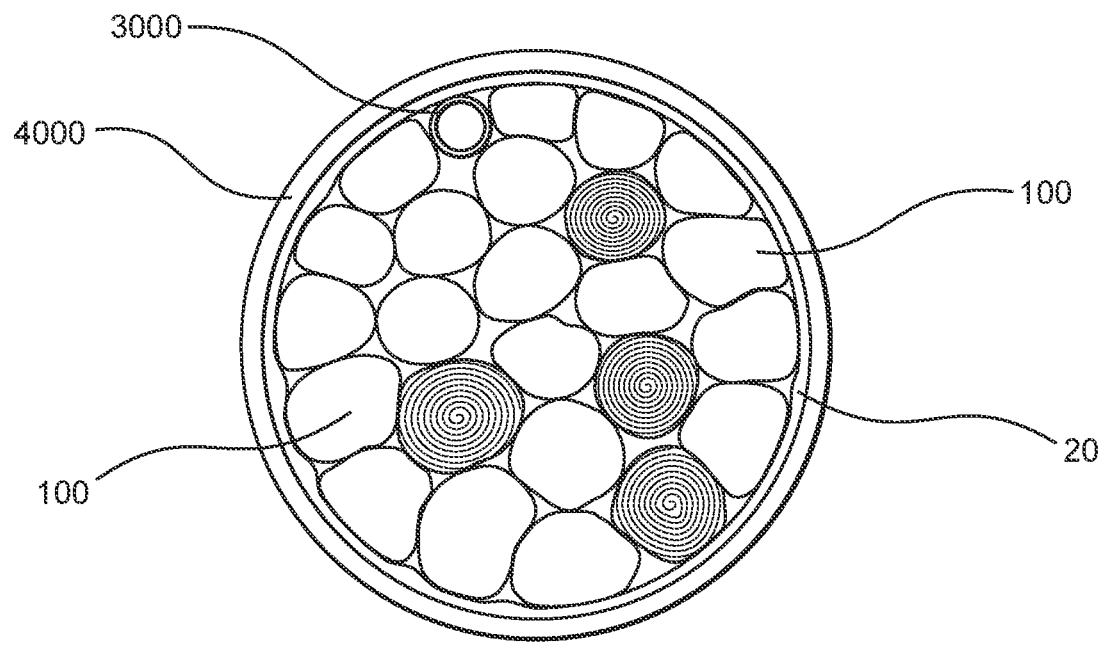
FIG. 5A is a depiction of one embodiment of the present invention deployed within a drum.
Figure 5B:
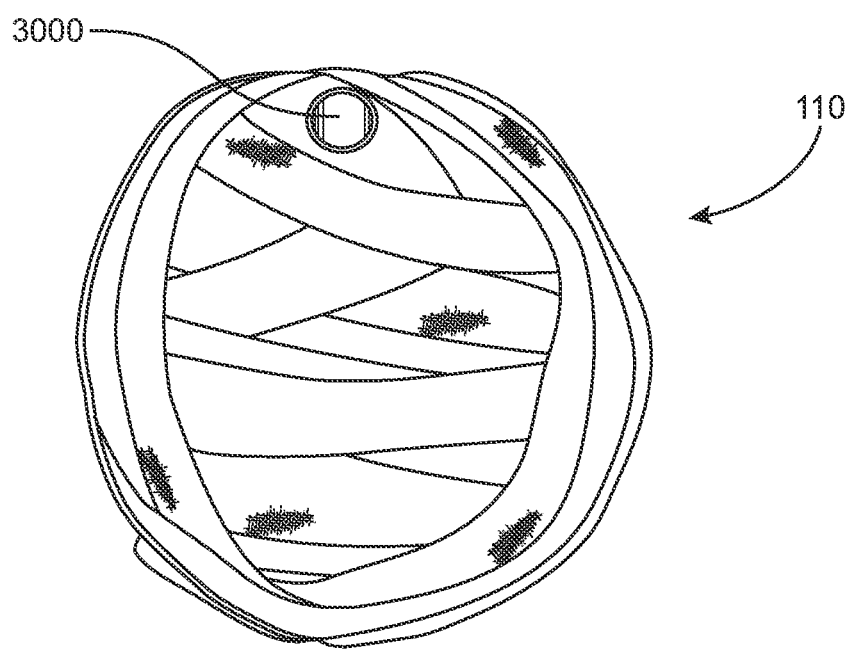
FIG. 5B is a top view of a drum cluster in accordance with one embodiment of the present invention.
Figure 5C:
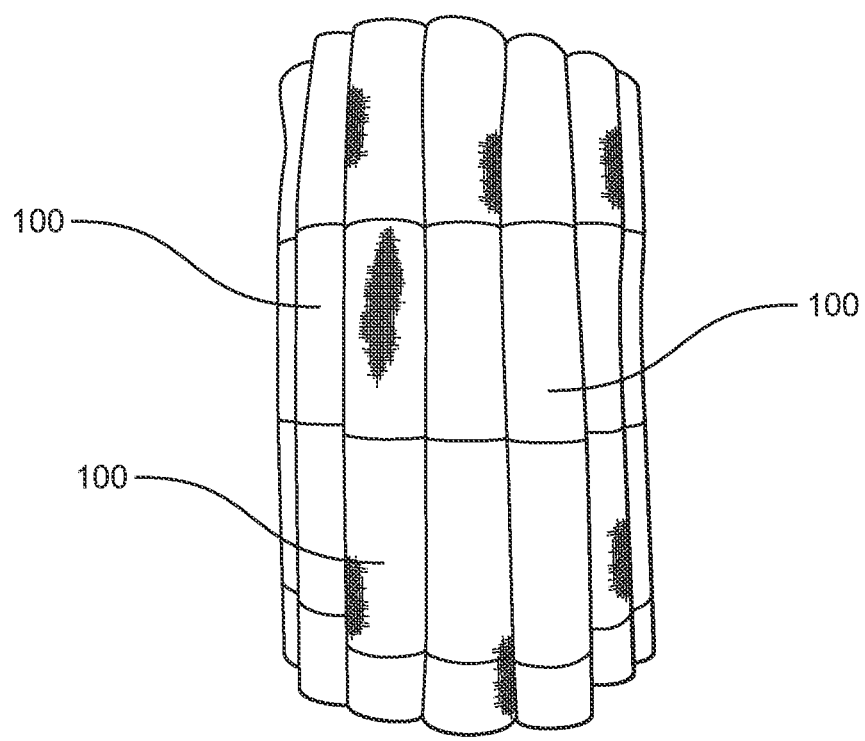
FIG. 5C is a side view of a plurality of assemblies to be utilized as a drum cluster prior to being wrapped.
Figure 5D:
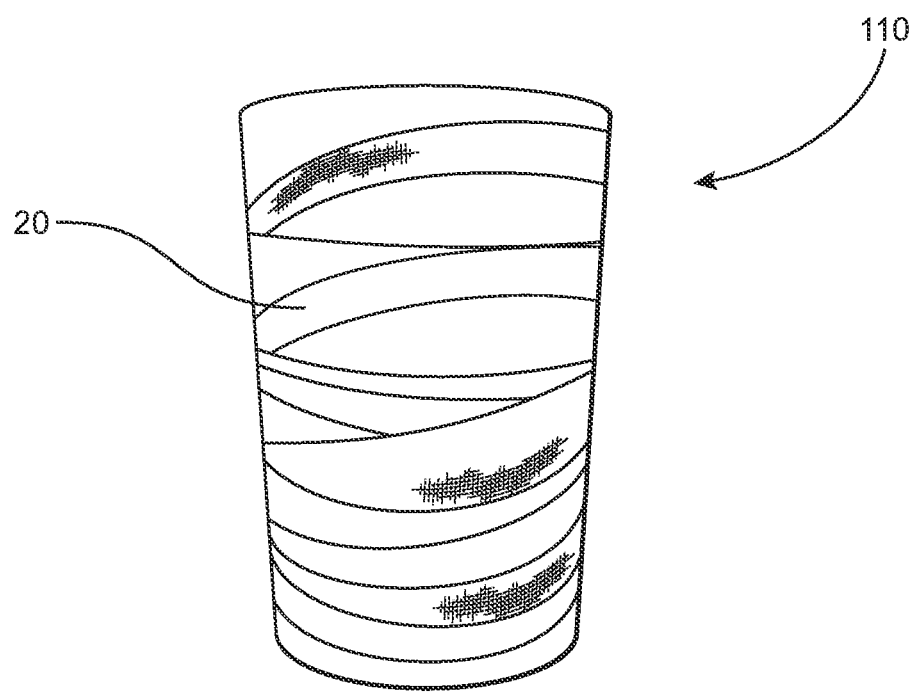
FIG. 5D is a side view of a drum cluster in accordance with one embodiment of the present invention.
Figure 9A:
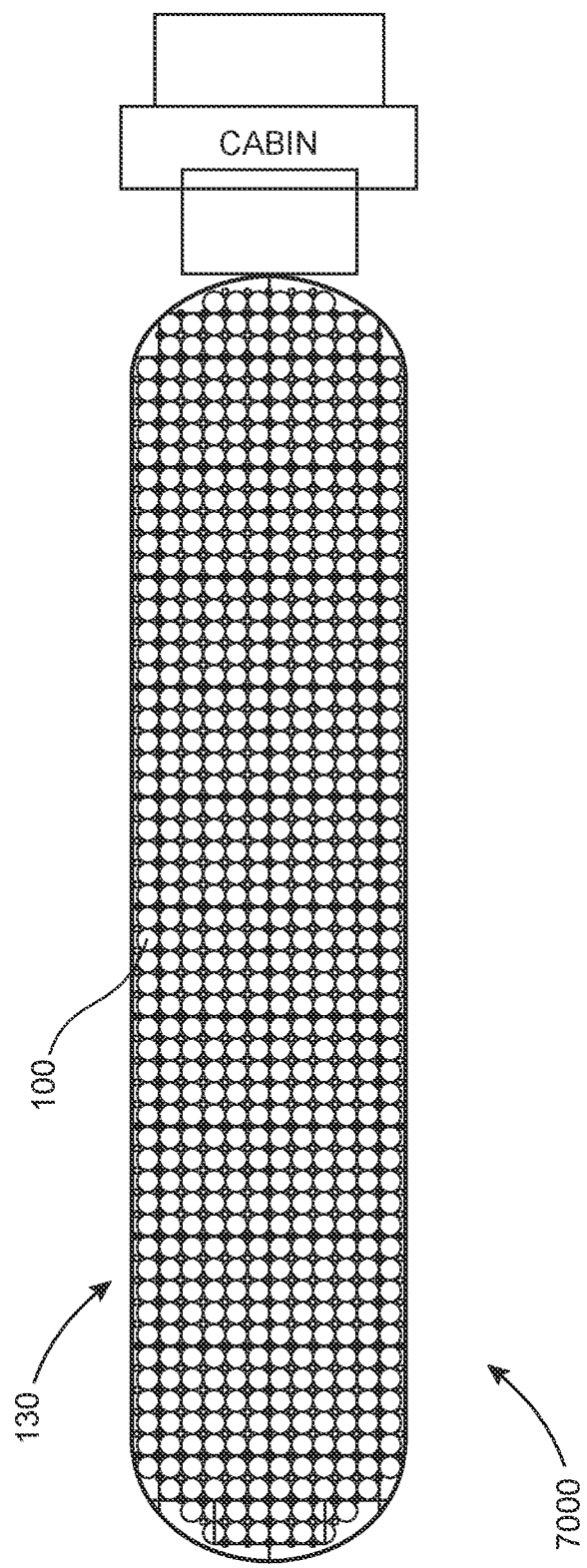
FIG. 9A is a top view schematic depiction of a plurality of cell clusters disposed within a large volume container, namely, a tanker truck.

A top and side view of the packed tower cylinders are shown in FIG. 5C. For a relatively flexible assembly 1000, the volume density of the mesh 1 in the drum results in 80% or more, with the exact value dependent upon the flexibility of the assembly 1000. In order to increase the density of mesh 1 near the container surface where there exists the possibility of having larger voids, several layers of mesh pads 111 are employed near the inner surface of the drum. A completely wrapped drum cluster 110 is shown in FIG. 9C. The volume loss of the depicted drum cluster 110 is 4100 ml, which amounts to approximately 2.05% for a 200 litre fuel drum (55-gallon class).

Figure 6A:
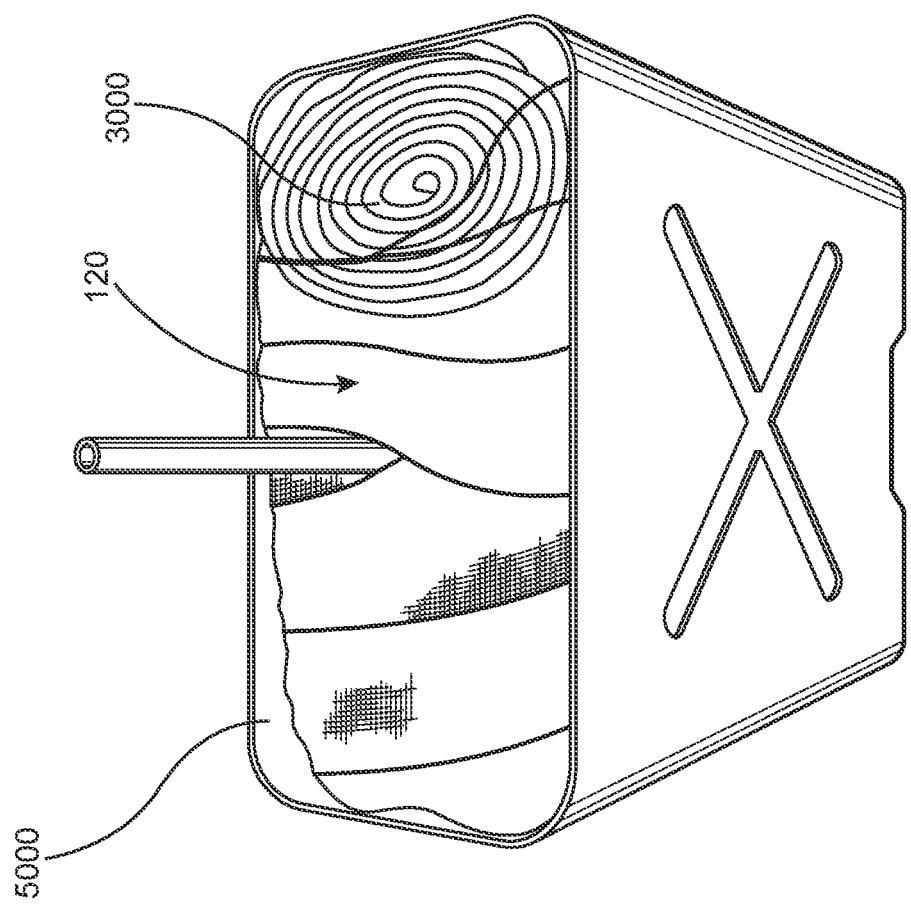
FIG. 6A is a schematic depiction of fill material suitable for use in connection with a jerry can.
Figure 6B:
FIG. 6B is a side view of a can cluster in accordance with one embodiment of the present invention.
Figure 6C:
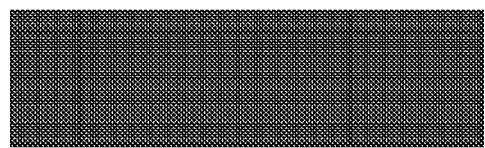
FIG. 6C is a top view of a can cluster in accordance with one embodiment of the present invention.
Figure 6D:
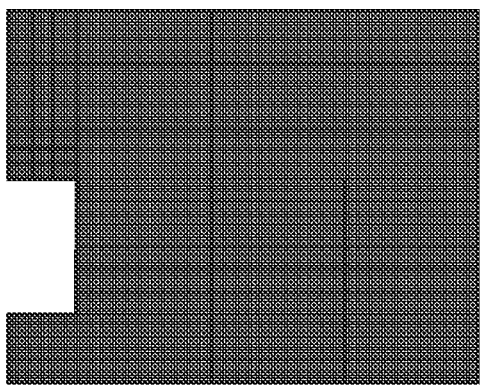
FIG. 6D is a front view of a can cluster in accordance with one embodiment of the present invention.
Figure 6E:
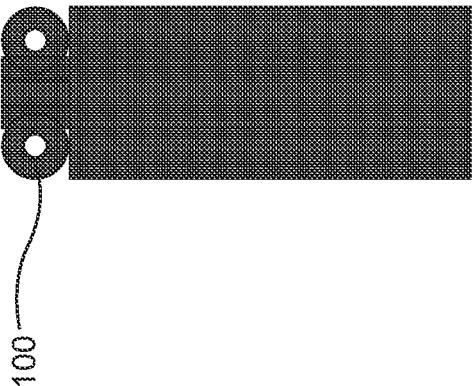
FIG. 6E is a rear view of a can cluster in accordance with one embodiment of the present invention.

In another embodiment, with reference to FIGS. 6A and 6F, the method and apparatus of filling another type of fluid container, namely, a portable fuel container 5000 commonly referred to as a jerry can is disclosed. The scheme of packing of basic modules 10 within a portable fuel container 5000 is shown in FIG. 6A. It contains basic modules 10 in suitably sized assemblies 100, the majority of which are packed in vertical directions to fill the space within the portable fuel container 5000.

However, packing solely in the vertical direction leaves considerable voids that inhibit the explosion resistant properties of the present invention. These spaces are filled with base modules 10 which are laid only in the top portion of the portable fuel container 5000 in such a way that it substantially approximates the shape of the container 5000. One of the major issues of such a container is the resistance provided by the mesh both for filling and withdrawal of fuel. In order to circumvent this problem, a fluid transfer channel 3000 is provided at one side of the can below filler cap. The diameter of the fluid transfer channel 3000 and the rate of pumping during filling is determined not only by the flow of the liquid into the tank but also by the removal of entrapped air in the meshed structure formed by the base modules 10.

The plurality of assemblies 1000 may be wrapped using the nets 20 and apparatus 2000 in the manner described above. The shape thus obtained, as shown in FIG. 6B-E, referred to as a can cluster 120, fits the interior of the container 5000 and is introduced prior to welding the top of the container 5000. When the present invention is deployed according to its most preferred embodiments, the volume occupied by the mesh is less than 2% of the available volume within the jerry can.

Figure 7:
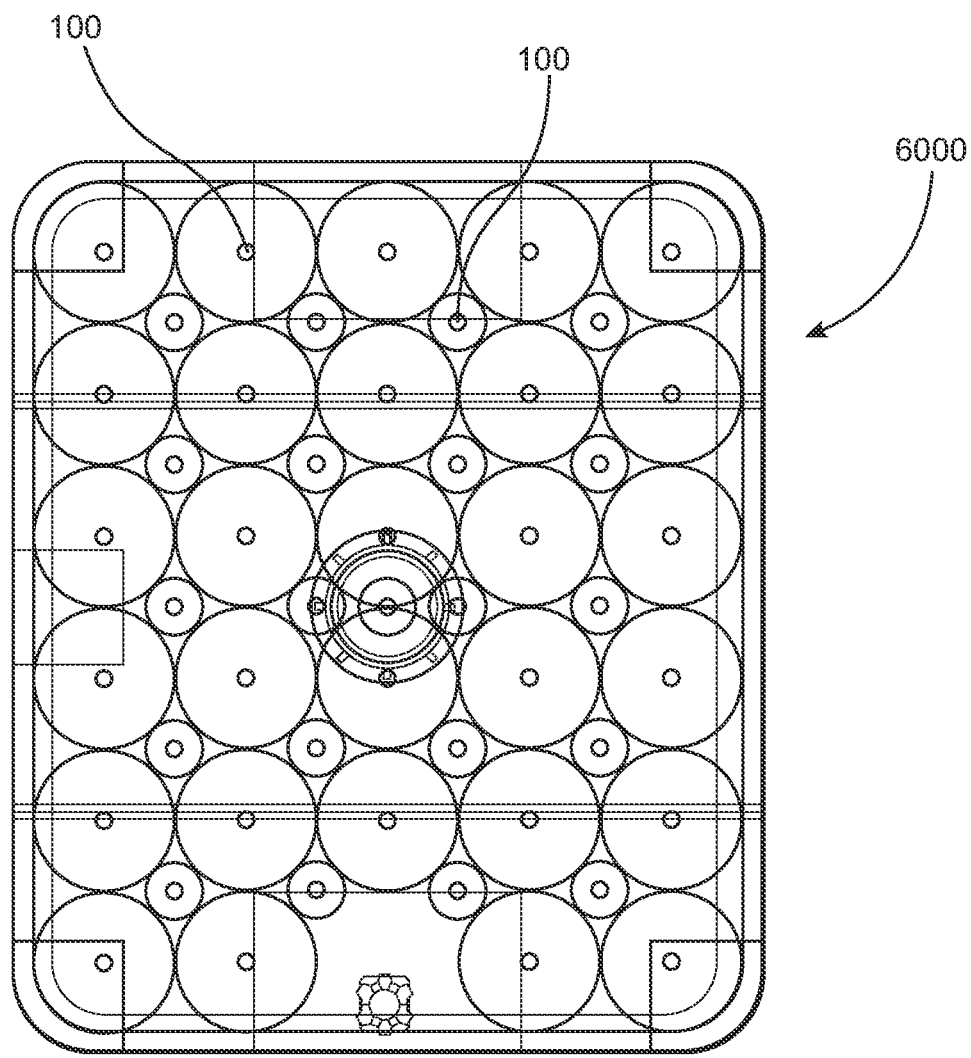
FIG. 7 is a schematic depiction of one embodiment of the present invention deployable as a mobile fuel station.

FIG. 7 discloses one embodiment of the present invention deployed in conjunction with yet another type of fluid container, namely, a mobile fuel station 6000, which typically include fuel tanks of 200 to 1000 litres in capacity, and are utilized in a variety a terrain, locations, conditions, with little to no safety precautions. In certain embodiments, a battery or solar powered fuel dispenser pump may be employed for dispensing fuel from the mobile fuel station. In the depicted embodiment, a specialized filter is inserted in the mouth of the reducer from a 50 mm butterfly valve to prevent particle suction into the pump. The tank of the mobile fuel station is filled with assemblies 1000 comprised of basic modules 10 according to the foregoing embodiments of the present invention, and may be collectively wrapped in a net 20 to form yet another cluster. The tank of the mobile fuel station may be grounded to eliminate static build up and related sparking. The main inlet of the tank is covered with a GI sheet including a fluid transfer channel that runs the length of the tank. The perforated tube facilitates decanting of fuel into the tank, while also providing space for a dip stick to measure the volume of fuel, or for sample collection.

As can be seen, two different dimensions of assemblies 100 are used to fill the space of the tanks. The dimensioning of the assemblies 100 is arrived at relative to the following considerations. The assemblies 100 need not be completely rigid, but should withstand a nominal amount of deformation and distortion. A single dimension, in spite of the nominal deformation, still leaves sufficient pockets of fuel free of mesh that may support combustion. Although not the exclusive embodiment of the present invention, the use of at least two dimensions of assemblies 100 was found to optimize the packing of a rectangular fuel tank. In the preferred embodiment, the ratio of the diameter of the two sizes of assemblies 100 are 1:0.4, with exact dimensions dependent upon the size of the tank. According to this embodiment, the present invention achieves a packing density greater than 80%, with nominal distributed voids in the volume of the tank.

In yet another embodiment, an inventive technique may be applied to deployment of the present invention within large containers, such as a trailered tank trucks (tankers) or railroad tank cars, intermodal tank containers, large volume stationery fuel tanks, and the like, which may also be pressurized. Such an embodiment is generally disclosed in FIGS. 8A-8B and 8A-8B.

Figure 8A:
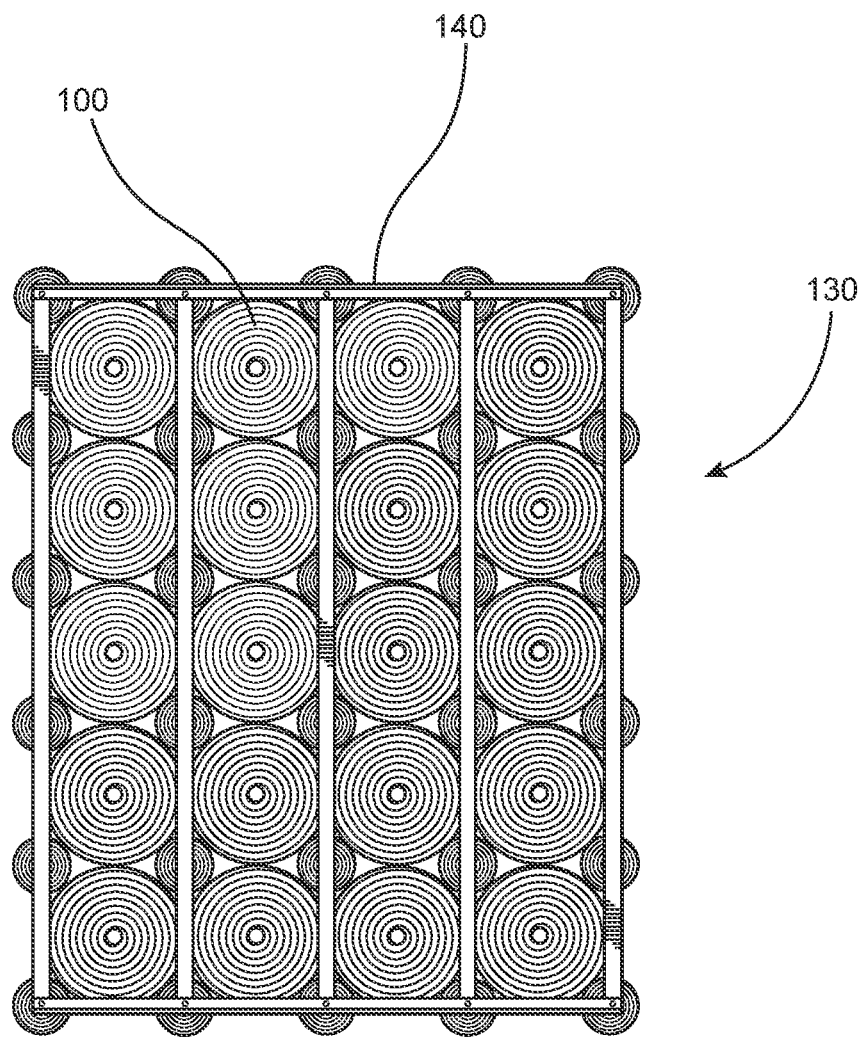
FIG. 8A is a top view of a cell cluster and lattice structure in accordance with one embodiment of the present invention.
Figure 8B:
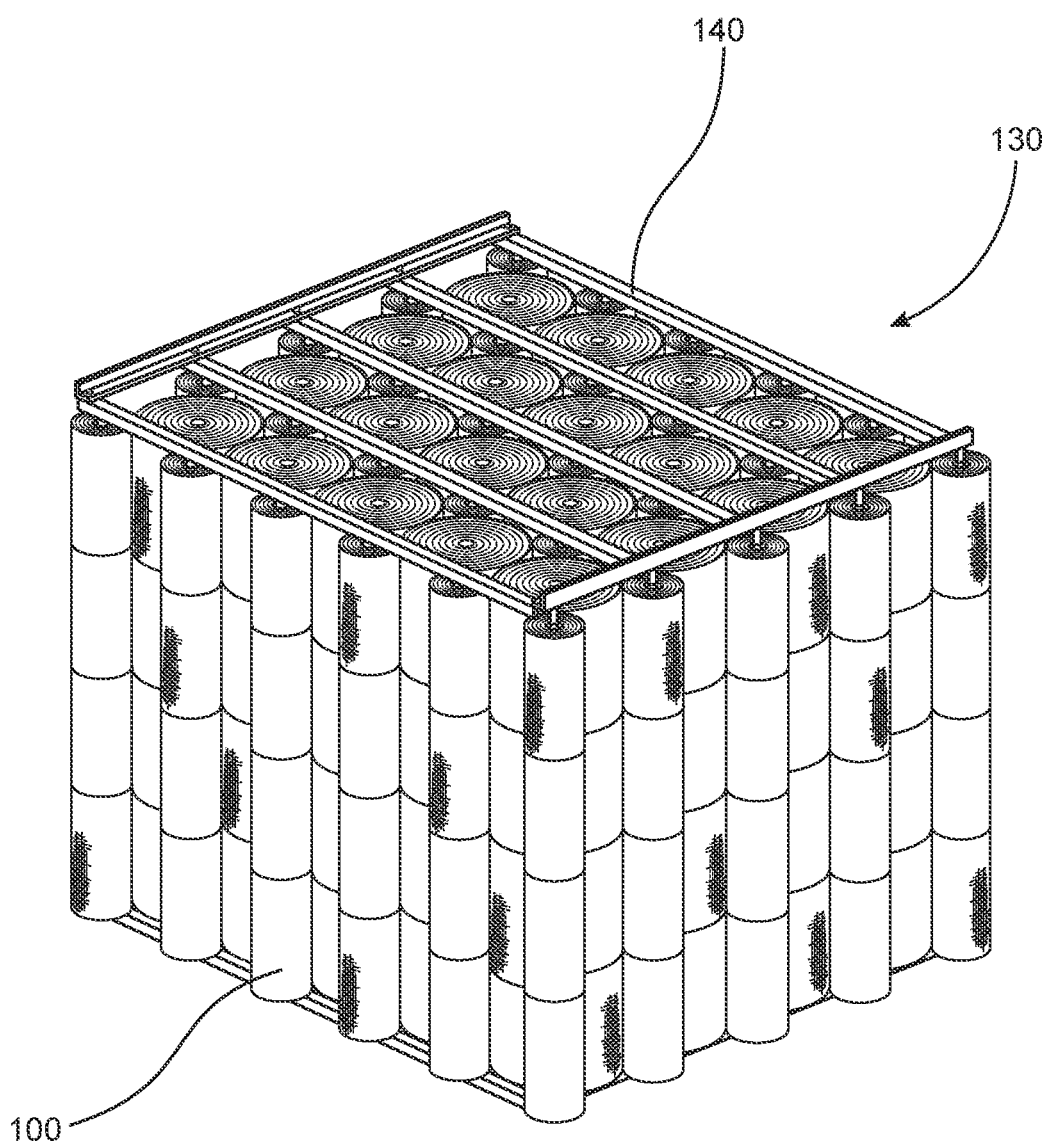
FIG. 8B is a perspective view of a cell cluster and lattice structure in accordance with one embodiment of the present invention.
Figure 9B:
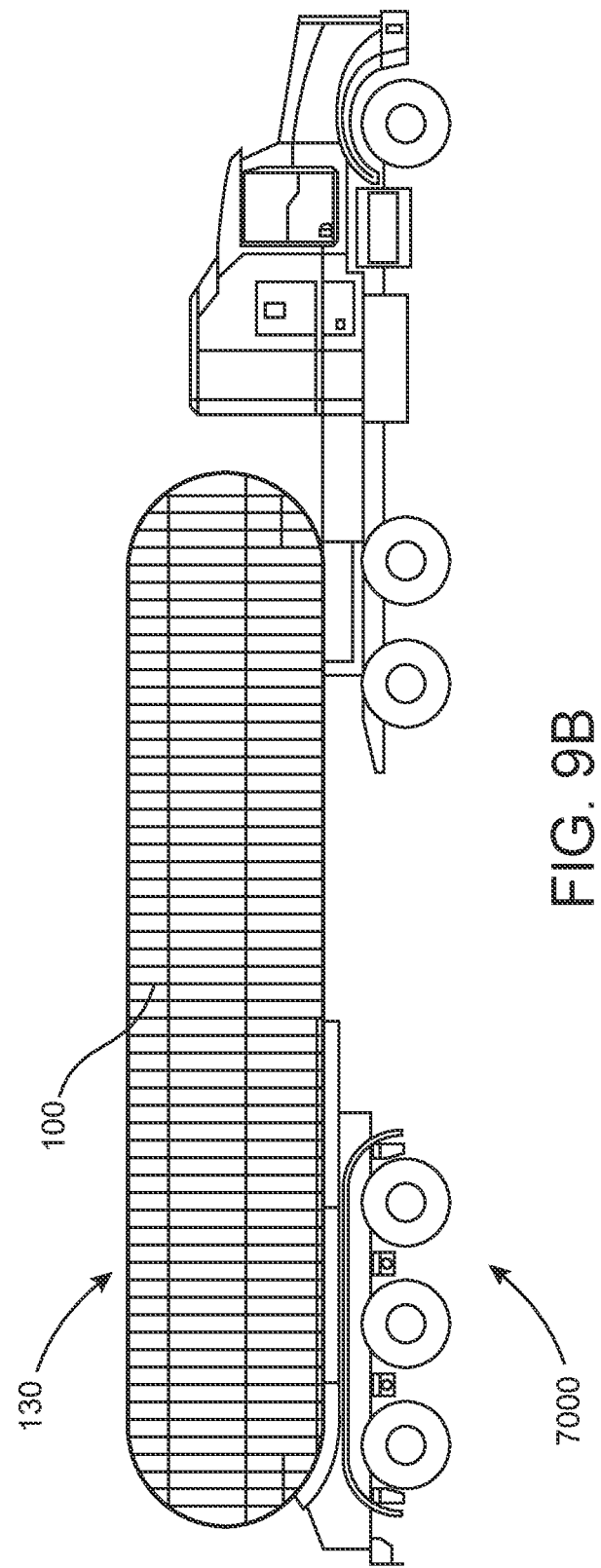
FIG. 9B is a side view schematic depiction of a plurality of cell clusters disposed within a large volume container, namely, a tanker truck.

With specific reference to FIGS. 8A and 8B, a plurality of basic modules 10 (which may be of varying dimensions) are disposed within a lattice structure 140 to create a cell cluster 130. The lattice structure 140 may include vertical supports about which the basic modules 10 are disposed and/or affixed. Accordingly, in the depicted embodiment, the use of nets 20 to secure the basic modules 10 into assemblies 100 is not strictly required, but may be utilized if desired. The cell clusters may then be stacked or otherwise arranged within a large volume container, such as the tanker depicted in FIGS. 9A and 9B.

Figure 10A:
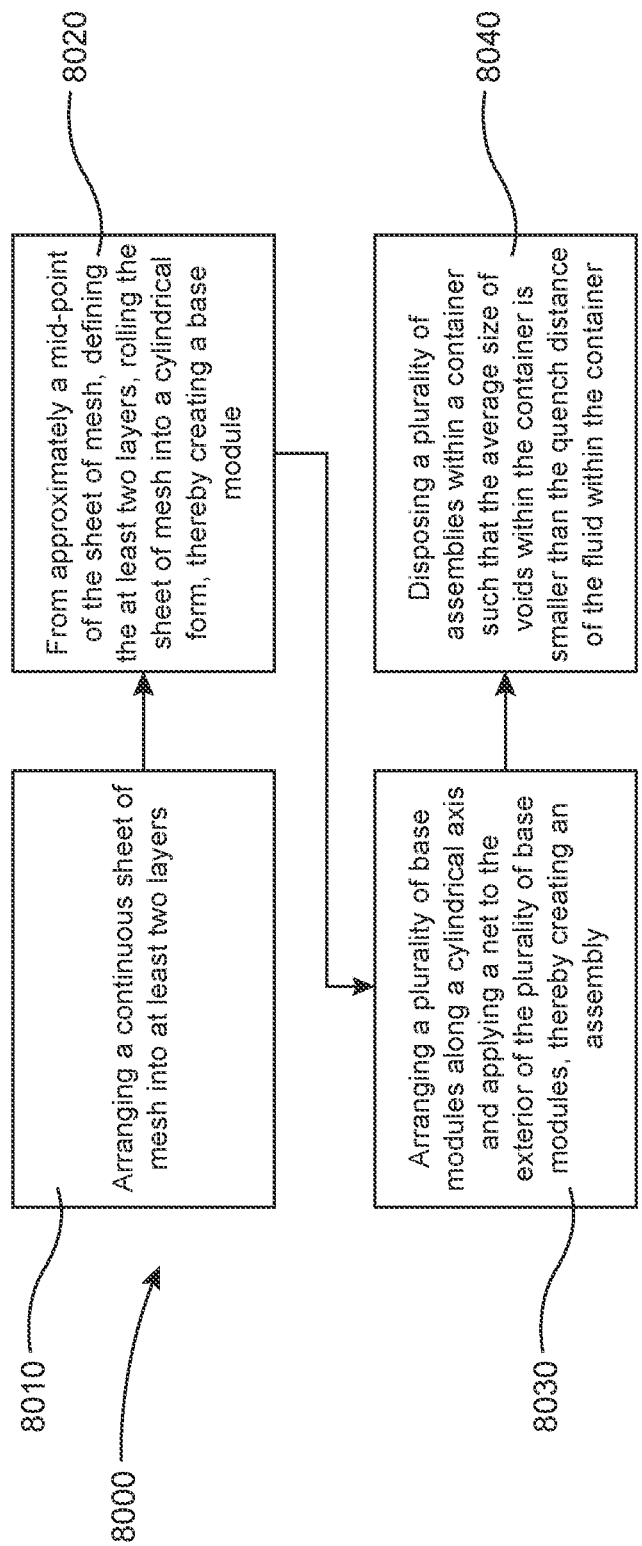
FIG. 10A is a schematic flow chart depicting operative steps of a method according to one embodiment of the present invention.

With respect to FIG. 10A, a schematic of an inventive methodology 8000 according to at least one embodiment of the present invention is depicted therein. As can be seen, a first step may comprise arranging a continuous sheet of mesh into at least two layers 8010. This step may be performed substantially as discussed herein with reference to FIGS. 2A-3B and accompanying discussion.

Another step of the inventive methodology may include rolling the sheet of mesh into a cylindrical form, thereby creating a base module 8020. This step may also be performed substantially as discussed herein with reference to FIGS. 2A-3B, wherein a spool of mesh is unspooled onto two separate carriage paths, substantially separated by a shaft of the rolling stage of a rolling apparatus; the sheet of mesh, after being severed from the spool, is held captive against a shaft at approximately its midpoint, and rolled into a cylindrical form.

Yet another step of the inventive methodology includes the formation of assemblies from base modules. In one embodiment, this step may include arranging a plurality of base modules along a cylindrical axis and applying a net to the exterior of the plurality of base modules 8030.

Another step of the inventive methodology includes disposing a plurality of assemblies within a container such that the average size of voids within the container is smaller than the quench distance of the fluid within the container 8040. As can be seen with respect to FIGS. 5A-9B this step can be accomplished in a variety of ways in regards to varying containers that are to be filled.

Figure 10B:
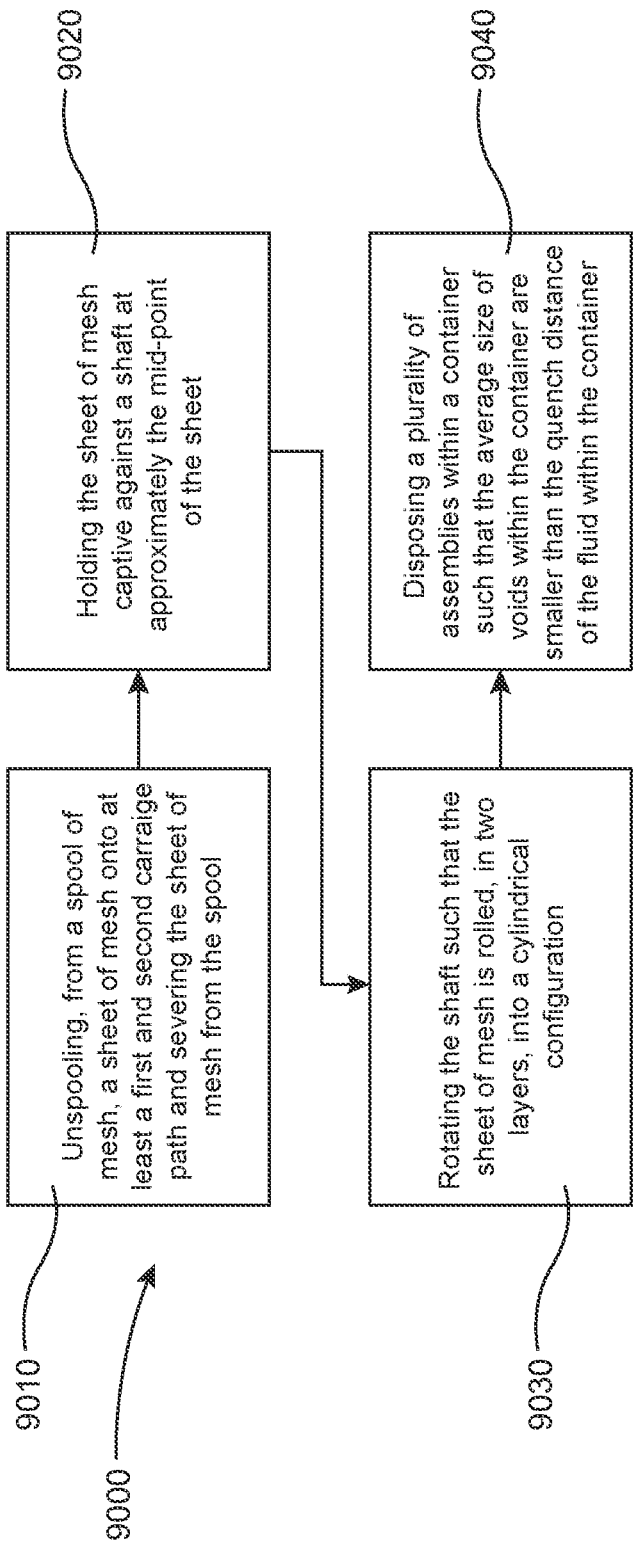
FIG. 10B is a schematic flow chart depicting operative steps of a method according to another embodiment of the present invention.

Now turning to FIG. 10B yet another inventive methodology 900 of the present invention is depicted therein in schematic form. According to the depicted embodiment, one step of the methodology includes unspooling, from a spool of mesh, a sheet of mesh onto at least a first and second carriage path and severing the sheet of mesh from the spool 9010. Another step of the inventive methodology 9000 includes holding the sheet of mesh captive against a shaft at approximately the mid-point of the sheet 9020. Another step includes rotating the shaft such that the sheet of mesh is rolled, in two layers, into a cylindrical configuration 9030. A final step of the inventive methodology includes disposing a plurality of assemblies within a container such that the average size of voids within the container are smaller than the quench distance of the fluid within the container 9040.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A fluid container comprising:
   a plurality of assemblies disposed therein;
   each of said plurality of assemblies comprising a plurality of base modules formed of mesh and disposed along a longitudinal axis; and
   a net wrapped about said plurality of assemblies.

2. The fluid container as recited in claim 1 further comprising a fluid transfer channel disposed within said plurality of assemblies.

3. The fluid container as recited in claim 1 wherein said container comprises a drum.

4. The fluid container as recited in claim 3 further comprising between 19 and 24 assemblies disposed within said drum.

5. The fluid container as recited in claim 1 wherein said longitudinal axis is aligned with the normal anticipated gravitational vector of said fluid container.

6. The fluid container as recited in claim 1 wherein said plurality of assemblies are oriented substantially parallel to the direction of gravity during storage of said fluid container.

7. The fluid container as recited in claim 1 wherein each of said plurality of assemblies is comprised of a cylindrical configuration.

8. The fluid container as recited in claim 1 wherein said container comprises a propane tank.

9. The fluid container as recited in claim 1 wherein said mesh is formed of an expanded sheet of 5052 aluminum alloy.

10. The fluid container as recited in claim 9 wherein said mesh is formed of a metallic foil approximately 45 microns in thickness.

11. A mobile fuel station comprising:
    a plurality of assemblies disposed therein, said plurality of assemblies including at least two different diameters;
    each of said plurality of assemblies comprising a plurality of base modules formed of mesh and disposed along a longitudinal axis; and
    a ratio of said at least two different diameters is 1:0.4.

12. A fuel drum comprising:
    a plurality of assemblies disposed therein;
    each of said plurality of assemblies comprising a plurality of base modules formed of mesh and disposed along a longitudinal axis; and each of said plurality of assemblies comprise a cylindrical configuration with a diameter of about twenty percent of a diameter of said drum.

\* \* \* \* \*